US011885636B2

United States Patent
Yadav

(10) Patent No.: US 11,885,636 B2
(45) Date of Patent: Jan. 30, 2024

(54) METHOD, APPARATUS, AND SYSTEM FOR AUTOMATICALLY CODING AND VERIFYING HUMAN SETTLEMENT CARTOGRAPHIC FEATURES

(71) Applicant: HERE Global B.V., Eindhoven (NL)

(72) Inventor: Ashish Deepchand Yadav, Mumbai (IN)

(73) Assignee: HERE GLOBAL B.V., Eindhoven (NL)

( * ) Notice: Subject to any disclaimer, the term of this patent is extended or adjusted under 35 U.S.C. 154(b) by 158 days.

(21) Appl. No.: 17/409,285

(22) Filed: Aug. 23, 2021

(65) Prior Publication Data
US 2023/0070876 A1    Mar. 9, 2023

(51) Int. Cl.
G06T 11/20 (2006.01)
G01C 21/00 (2006.01)
G01C 21/34 (2006.01)

(52) U.S. Cl.
CPC ...... *G01C 21/3811* (2020.08); *G01C 21/3415* (2013.01); *G01C 21/3841* (2020.08);
(Continued)

(58) Field of Classification Search
CPC ............ G01C 21/3811; G01C 21/3841; G01C 21/3867; G06T 11/203
(Continued)

(56) References Cited

U.S. PATENT DOCUMENTS 6,314,349 B1 * 11/2001 Tomasi ............... F41G 7/34
701/23
8,121,350 B2 * 2/2012 Klefenz ............... G06V 10/48
348/148

(Continued)

FOREIGN PATENT DOCUMENTS

CN    107016403 A    8/2017
IN    201821010661 A    12/2018

OTHER PUBLICATIONS

Lin et al., "Automatic Updating of Land Cover Maps in Rapidly Urbanizing Regions by Relational Knowledge Transferring from GlobeLand30", Article, Remote Sensing 11(12):1397, Published: Jun. 12, 2019, pp. 1-28.

(Continued)

*Primary Examiner* — Hunter B Lonsberry
*Assistant Examiner* — Robert Louis Pinkerton

(57) ABSTRACT

An approach is provided for automatically coding cartographic feature(s), e.g., human settlement(s). The approach involves receiving data point(s) associated with point location(s) and indicative of a cartographic feature. The approach also involves retrieving or generating a cartographic feature polygon corresponding to the cartographic feature based on the data point(s). The approach further involves generating a plurality of polygon data points that replicate the cartographic feature polygon, and/or a spider web model that represents the point location(s). The approach further involves retrieving imagery data depicting the cartographic feature based on the plurality of polygon (Continued)

data points and/or the spider web model. The approach further involves merging the data point(s), the plurality of polygon data points, and/or the imagery data to generate new or updated polygon structure data point(s) to represent the cartographic feature. The approach further involves storing the new or updated polygon structure data point(s) in a map database.

20 Claims, 19 Drawing Sheets

(52) U.S. Cl.
CPC ..... *G01C 21/3848* (2020.08); *G01C 21/3867* (2020.08); *G06T 11/203* (2013.01)

(58) Field of Classification Search
USPC .......................................................... 701/450
See application file for complete search history.

(56) References Cited

U.S. PATENT DOCUMENTS

| | | | | |
|---|---|---|---|---|
| 10,970,318 | B2* | 4/2021 | Aggarwal | G01C 21/3811 |
| 11,041,730 | B2* | 6/2021 | Colgate | G01C 21/3841 |
| 2006/0101005 | A1* | 5/2006 | Yang | G06F 16/9537 |
| 2007/0273558 | A1* | 11/2007 | Smith | G08G 1/0962 |
| | | | | 340/995.1 |
| 2008/0172433 | A1* | 7/2008 | Lee | E04G 21/3266 |
| | | | | 703/2 |
| 2011/0267369 | A1* | 11/2011 | Olsen | G09G 5/14 |
| | | | | 345/634 |
| 2011/0280453 | A1* | 11/2011 | Chen | G06T 7/75 |
| | | | | 382/113 |
| 2012/0038662 | A1* | 2/2012 | Dicklin | G06F 16/29 |
| | | | | 345/635 |
| 2013/0002648 | A1* | 1/2013 | Bacus | G06F 16/972 |
| | | | | 345/419 |
| 2013/0144565 | A1* | 6/2013 | Miller | G06T 17/20 |
| | | | | 703/1 |
| 2013/0321407 | A1* | 12/2013 | Jenkins | G06F 16/29 |
| | | | | 707/706 |
| 2014/0278065 | A1* | 9/2014 | Ren | G06T 17/05 |
| | | | | 701/454 |
| 2016/0217153 | A1* | 7/2016 | Hendrey | G06T 11/20 |
| 2016/0335923 | A1* | 11/2016 | Hofmann | G01C 21/3819 |
| 2018/0012405 | A1* | 1/2018 | Hendrey | A63F 13/577 |
| 2019/0268366 | A1* | 8/2019 | Zeng | G06N 3/047 |
| 2019/0311205 | A1* | 10/2019 | Mittal | G06T 7/12 |
| 2020/0192356 | A1* | 6/2020 | Stenneth | B60W 60/0053 |
| 2020/0201869 | A1* | 6/2020 | Mihic | G06F 16/24575 |
| 2021/0231444 | A1* | 7/2021 | Mudda | G01C 21/32 |

OTHER PUBLICATIONS

Lin et al., "Automated Extraction of Built-Up Areas by Fusing VIIRS Nighttime Lights and Landsat-8 Data", Article, Published: Jul. 2, 2019, pp. 1-20.

* cited by examiner

METHOD, APPARATUS, AND SYSTEM FOR AUTOMATICALLY CODING AND VERIFYING HUMAN SETTLEMENT CARTOGRAPHIC FEATURES

BACKGROUND

Location-based service providers (e.g., mapping and navigation providers) are continually challenged to provide compelling services and applications. One area of development relates to providing accurate and reliable human settlement information for navigation, logistic services, urbanization analyses, city management and planning, etc. Human settlements (e.g., a city, town, village, buildings, etc.) are commonly evolving and the related map features and characteristics (e.g., locations, sizes, etc.) can significantly affect navigation, etc.; hence they need to be accurately coded in maps (e.g., digital maps). However, human settlement feature data is currently extracted from image data (e.g., aerial images, video drive files, third-party cartographic sources, etc.), and requires manual creation of cartographic feature polygons that is time consuming and susceptible to errors. Accordingly, mapping service providers face significant technical challenges to automatically and accurately code and verify human settlement areas and their attributes.

SOME EXAMPLE EMBODIMENTS

Therefore, there is a need for an approach for automatically and accurately coding and verifying a non-uniform cartographic feature, such as a human settlement area.

According to one embodiment, a method comprises receiving at least one data point of a data type that is indicative of a cartographic feature. The data point is associated with at least one point location. The method also comprises retrieving or generating a cartographic feature polygon corresponding to the cartographic feature based on the at least one point location. The method further comprises generating at least one of: a plurality of polygon data points that replicate the cartographic feature polygon, and a spider web model that represents the at least one point location of the at least one data point. The method further comprises retrieving imagery data depicting the cartographic feature based on the plurality of polygon data points, the spider web model, or a combination thereof. The method further comprises merging the at least one data point, the plurality of polygon data points, the imagery data, or a combination thereof to generate one or more new polygon structure data points or one or more updated polygon structure data points to represent the cartographic feature. The method further comprises storing the one or more new polygon structure data points or the one or more updated polygon structure data points in a map database.

According to another embodiment, an apparatus comprising at least one processor, and at least one memory including computer program code, the at least one memory and the computer program code configured to, with the at least one processor, cause the apparatus to receive at least one data point of a data type that is indicative of a cartographic feature. The data point is associated with at least one point location. The apparatus is also caused to retrieve or generate a cartographic feature polygon corresponding to the cartographic feature based on the at least one point location. The apparatus is further caused to generate at least one of: a plurality of polygon data points that replicate the cartographic feature polygon, and a spider web model that represents the at least one point location of the at least one data point. The apparatus is further caused to retrieve imagery data depicting the cartographic feature based on the plurality of polygon data points, the spider web model, or a combination thereof. The apparatus is further caused to merge the at least one data point, the plurality of polygon data points, the imagery data, or a combination thereof to generate one or more new polygon structure data points or one or more updated polygon structure data points to represent the cartographic feature. The apparatus is further caused to store the one or more new polygon structure data points or the one or more updated polygon structure data points in a map database.

According to another embodiment, a computer-readable storage medium carrying one or more sequences of one or more instructions which, when executed by one or more processors, cause an apparatus to receive at least one data point of a data type that is indicative of a cartographic feature. The data point is associated with at least one point location. The apparatus is also caused to retrieve or generate a cartographic feature polygon corresponding to the cartographic feature based on the at least one point location. The apparatus is further caused to generate at least one of: a plurality of polygon data points that replicate the cartographic feature polygon, and a spider web model that represents the at least one point location of the at least one data point. The apparatus is further caused to retrieve imagery data depicting the cartographic feature based on the plurality of polygon data points, the spider web model, or a combination thereof. The apparatus is further caused to merge the at least one data point, the plurality of polygon data points, the imagery data, or a combination thereof to generate one or more new polygon structure data points or one or more updated polygon structure data points to represent the cartographic feature. The apparatus is further caused to store the one or more new polygon structure data points or the one or more updated polygon structure data points in a map database.

According to another embodiment, an apparatus comprises means for receiving at least one data point of a data type that is indicative of a cartographic feature. The data point is associated with at least one point location. The apparatus also comprises means for retrieving or generating a cartographic feature polygon corresponding to the cartographic feature based on the at least one point location. The apparatus further comprises means for generating at least one of: a plurality of polygon data points that replicate the cartographic feature polygon, and a spider web model that represents the at least one point location of the at least one data point. The apparatus further comprises means for retrieving imagery data depicting the cartographic feature based on the plurality of polygon data points, the spider web model, or a combination thereof. The apparatus further comprises means for merging the at least one data point, the plurality of polygon data points, the imagery data, or a combination thereof to generate one or more new polygon structure data points or one or more updated polygon structure data points to represent the cartographic feature. The apparatus further comprises means for storing the one or more new polygon structure data points or the one or more updated polygon structure data points in a map database.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for automatically coding a non-uniform cartographic feature are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
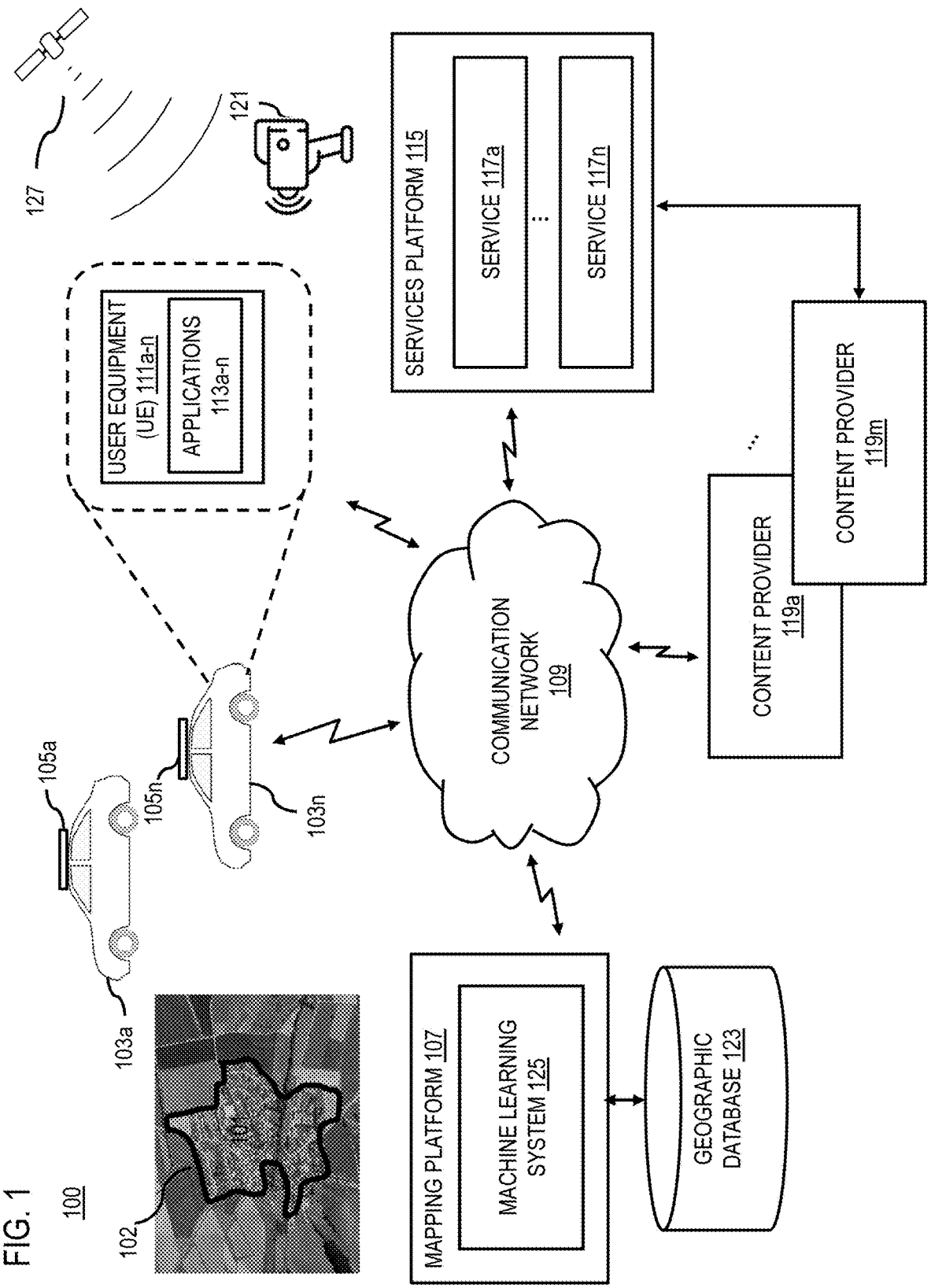
FIG. 1 is a diagram of a system for automatically coding a non-uniform cartographic feature, according to one embodiment.

FIG. 1 is a diagram of a system for automatically coding a non-uniform cartographic feature (e.g., a human settlement area), according to one embodiment. As described above, location-based service providers (e.g., mapping and navigation providers) are continually challenged to provide compelling services and applications. One area of development relates to providing users navigation support when traveling on a road network. Providing accurate map data is a key aspect of providing such support. Human settlement areas (e.g., a group of houses/buildings, malls or other points of interests, city, town, village, etc.) are common map features and their characteristics (e.g., width, height, and length) can significantly affect traffic flows; hence they need to be accurately coded in maps (e.g., digital maps).

However, creating and validating a polygonal boundary for a settlement area or other non-uniform cartographic features (e.g., built up areas) is often time-consuming and/or expensive (e.g., due to manual input requirements). For instance, it can be difficult to detect and validating a settlement boundary and/or features simply using images. For example, raster/aerial/satellite images alone often cannot provide sufficient information for settlement boundary detection, coding, and validation. Some mapping processes can detect a settlement area using video drive files, and then code the settlement area manually. However, these manual processes can be time consuming and susceptible to human errors. Some other mapping processes can extract settlement area locations from satellite images. However, this extraction process can require significant computation resources and still require manual validation. Accordingly, mapping service providers face significant technical challenges to efficiently and accurately code and validate a human settlement area and other non-uniform cartographic features.

To address these problems, the system 100 of FIG. 1 introduces a capability to automatically code a non-uniform cartographic feature in a map database. In one embodiment, the system 100 can automate the coding process based on the existing data sets (e.g., drive files, community feedbacks, third party reference sources, Light Detection and Ranging (LiDAR) imagery, etc.) to locate settlement(s) 101, built up area(s), etc., and derive monochrome imagery of respective location data of settlement cartographic feature(s) to create (1) polygon data points or (2) a spider web polygonal model ("web model"). The system 100 can use the polygon data points or the web model to generate a set of settlement cartographic feature data points to send to a comparator to generate a more accurate polygon 102, and then send a coder for coding in a map database.

When analyzing the image data of multiple hours/days/weeks/months/etc., the system 100 can identify settlement development and/or migration in the image data of a geographic area, which is a significant indication of the presence of a new settlement or an evaluation of an existing settlement. This helps the system 100 to add or update a settlement area polygon 102 in a map database (e.g., a digital map).

Figure 2A:
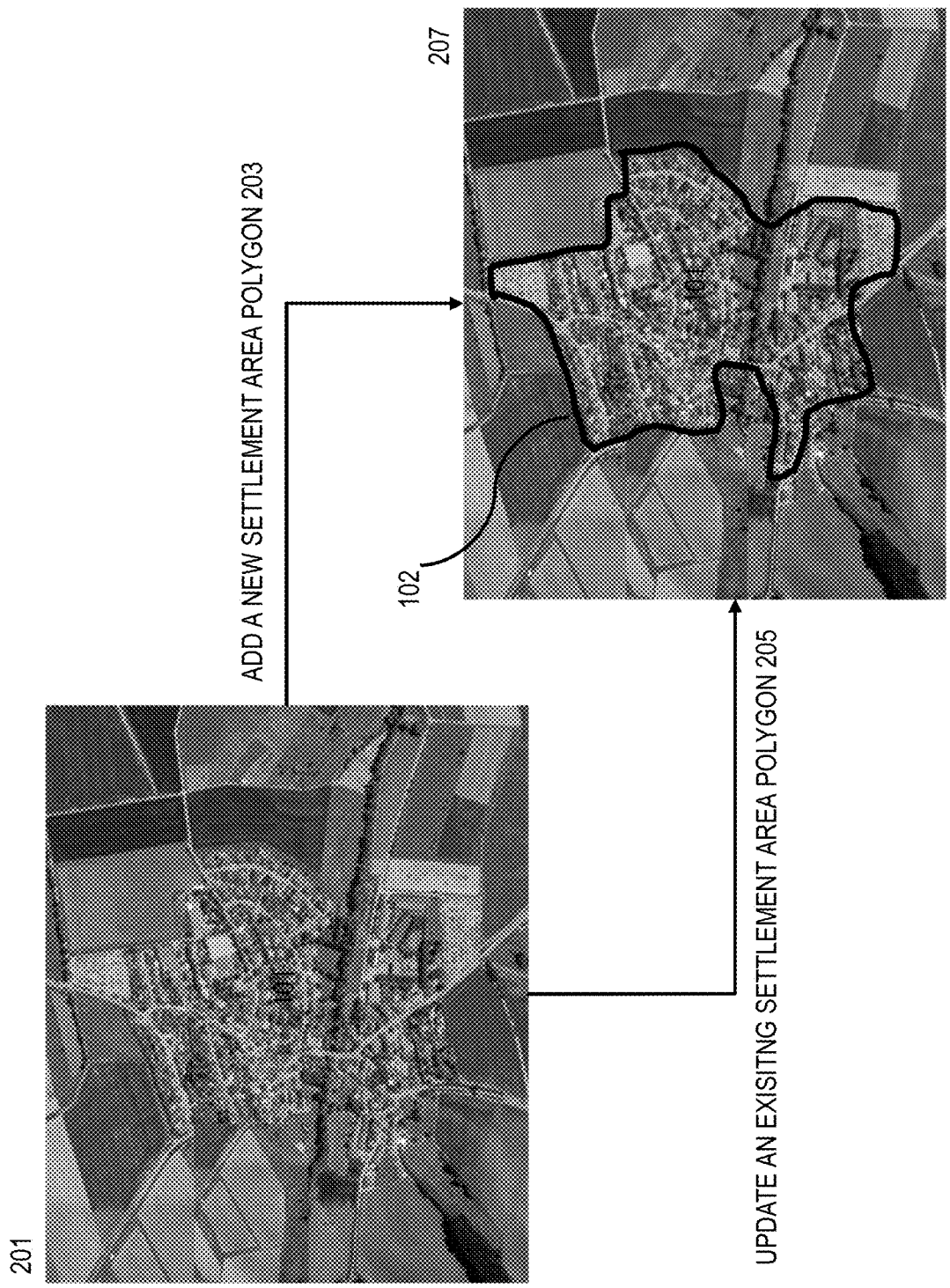
FIG. 2A are diagrams illustrating an example cartographic feature polygon before and after processing, according to one embodiment.

FIG. 2A are diagrams illustrating an example cartographic feature polygon before and after processing, according to one embodiment. The system 100 can generate or update a cartographic feature polygon for any non-uniform cartographic features (e.g., settlements, built-up-areas (BUAs), etc.). A cartographic feature polygon is a plane figure with a finite number of straight line segments connected to form a closed polygonal boundary of a cartographic feature representing a physical feature (both natural and manmade objects) on the ground in the real world. The line segments of the polygon are called its edges or sides.

A human settlement can be a community in which people live, such as a small number of dwellings grouped together, villages, towns, cities, etc. In other words, a settlement can be a city, town, village or other agglomeration of buildings where people live and work. A built-up-area (BUA) can have the presence of buildings (roofed structures), thus exclude other parts of urban environments or human footprint such as paved surfaces (e.g., roads, parking lots, etc.), commercial and industrial sites (e.g., ports, landfills, quarries, runways, etc.) and urban green spaces (e.g., parks, gardens, etc.). Other non-uniform cartographic features may include the paved surfaces, the commercial and industrial sites and the urban green spaces that are excluded from the BUAs, subway lines, railroads, landmarks, harbors, pedestrian zones, beaches, forests, lakes, islands, rivers, canal/water channels, etc. As more and more public and private entities and services use open-source map databases (e.g., OpenStreetMap) as a base map, more volunteers are contributing map data and sometime adding new non-uniform cartographic features. OpenStreetMap allows an unlimited number of attributes describing a feature, and uses the feature pages to provide short descriptions of tags that relate to particular features.

Figure 2B:
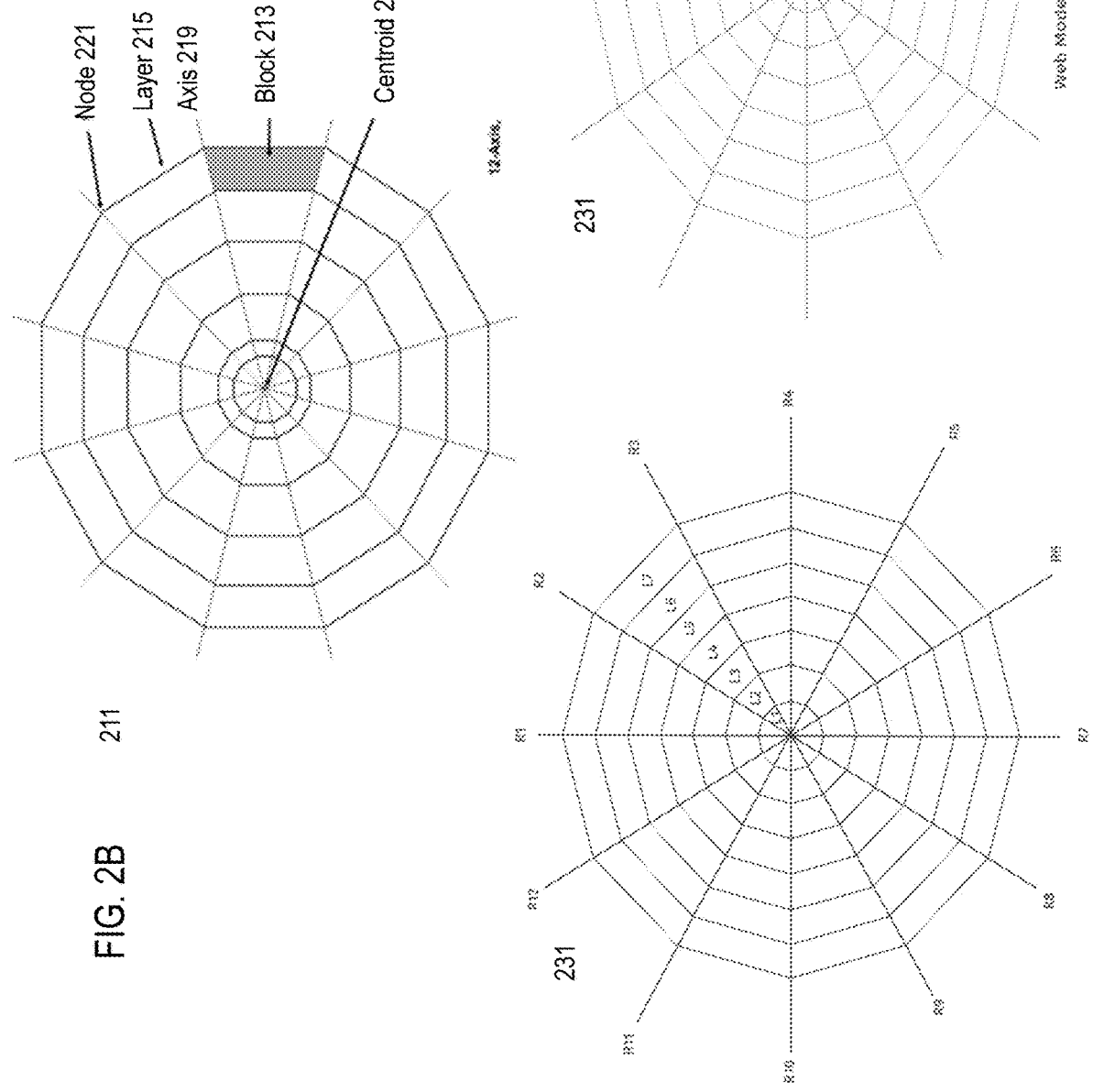
FIGS. 2B-2C are diagrams illustrating example spider web models, according to various embodiments.
Figure 2C:
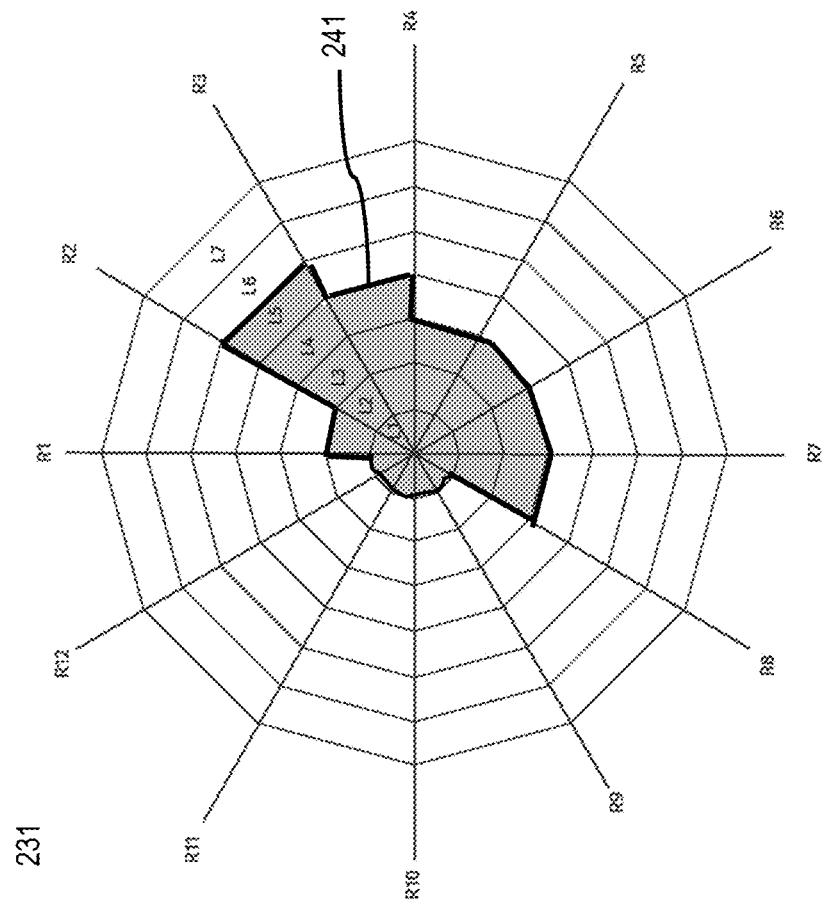

In FIG. 2A, the system 100 can either generate a new settlement area polygon 102 for the settlement area 101 (e.g., a group of houses surrounded by farms) depicted in an image 201 via a process 203, or update an existing settlement area polygon 102 depicted in an image 207 via a process 205. For instance, either the process 203 or the process 205 can involve a spider web model. FIGS. 2B-2C are diagrams illustrating example spider web models, according to various embodiments.

In FIG. 2B, the spider web model 211 can be a polygonal structure including a plurality of polygons/blocks 213 of different sizes respectively bounded by different layers 215 (i.e., L1-Ln) having a common centroid 217 and a plurality of radial axes 219 (i.e., R1-Rn) originating from the common centroid 217. The radial axes 219 cross the layers 215 at nodes 221 (i.e., Rn, Ln). By way of example, the spider web model 211 has attributes of 12 radial axes, 6 layers, 72 blocks, 72 nodes, and 1 centroid (i.e., R0, L0). As another example, a spider web model 231 also has 12 radial axes (i.e., R1-R12) and 1 centroid, but 7 layers (i.e., L1-L7), thus 84 blocks and 84 nodes. The spider web model 231 further depicts the radial axis R1 cross the seven layers (i.e., L1-L7) at nodes (R1, L1), (R1, L2), (R1, L3), (R1, L4), (R1, L5), (R1, L6), and (R1, L7). The higher numbers of radial axes and layers, the more accurately a spider web model can represent a settlement area polygon.

In FIG. 2C, the system 100 can place the centroid (i.e., R0, L0) of the web model 231 over any one of the data points collected from the multiple sources (e.g., a drive file, community feedbacks, third party reference sources, LiDAR imagery, etc.), and request an image (e.g., a default image, an image of interest such as the image 201 of FIG. 2A, etc.). The system 100 will process the image to generate polygon boundary 241 in FIG. 2C. In this example, the system 100 can select the block nodes in the following order: {R0,L0; R1,L2; R2,L2; R2,L5; R3,L5; R3,L4; R4,L4; R4,L3; R5,L3; R6,L3; R7,L3; R8,L3; R8,L1; R9,L1; R10,L1; R11,L1; R12,L1; R1,L1; R1,L2}, to create an accurate polygon.

Figure 3A:
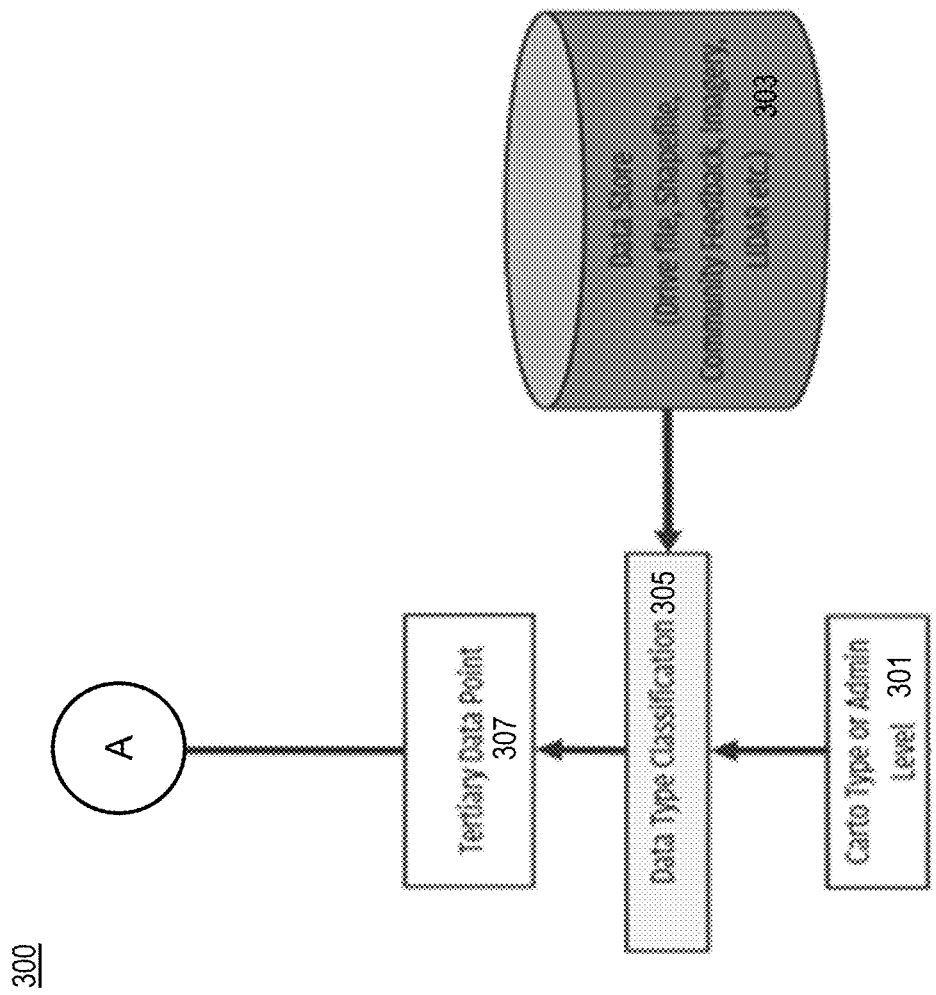
FIGS. 3A-3C are diagrams of a process 300 for automatically coding a non-uniform cartographic feature, according to one embodiment.
Figure 3B:
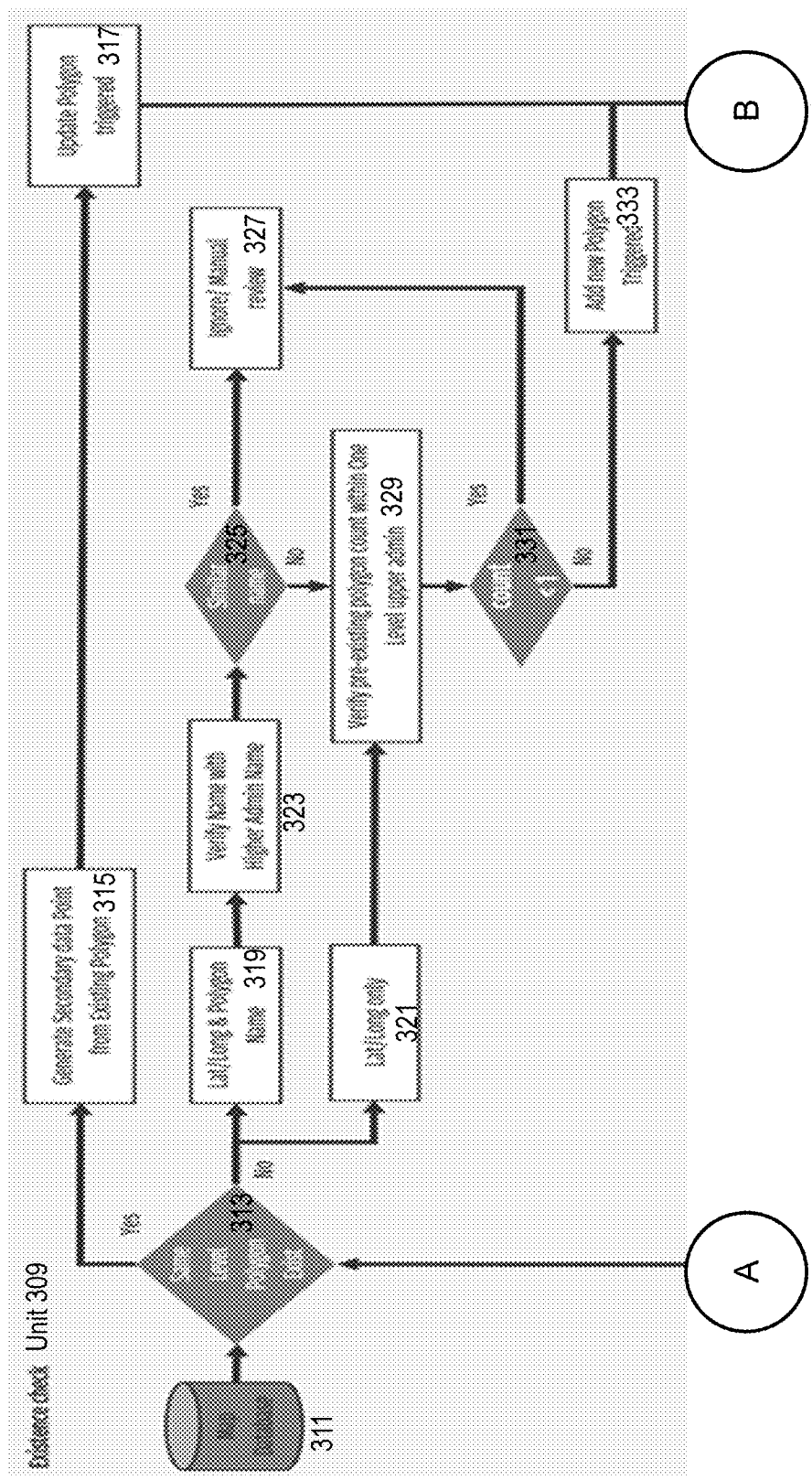
Figure 3C:
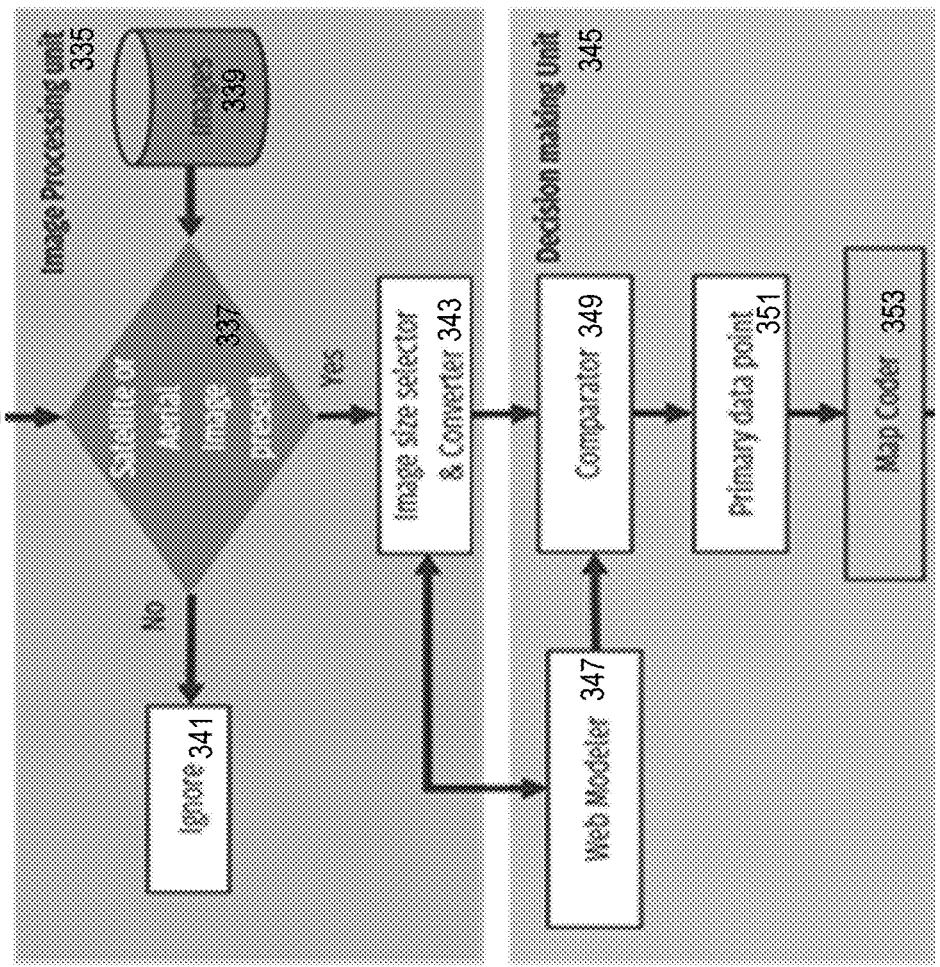

FIGS. 3A-3C are diagrams of a process 300 for automatically coding a non-uniform cartographic feature, according to one embodiment. In one embodiment, for example, in step 301 in FIG. 3A, the system 100 can prompt a user to select a desired carto type and/or admin level to add or update. By way of example, admin levels can be based on population such as a house is at the lowest level, then apartment, condominium, home owner association cluster, village, town, city, etc. while the metropolitan is at the top with the greatest number of residents. As another example, when the position of a settlement in the hierarchy is intended to form decisions about new developments such as housing, the admin levels can be constructed based on the services available within each settlement as "level 1", "level 2", etc.

In terms of carto type, in one embodiment, the system 100 can define its own carto types and/or admin levels. As other embodiment, the system 100 can adapt carto types and/or admin levels defined in an existing database, such as an open-source database (e.g., OpenStreetMap), a commercial database, and/or any other existing off-the-shelf map feature source. In addition or alternatively, the map feature sources can include databases that are proprietary to a respective services, etc. generated using any means (e.g., remote sensing as well as non-remote sensing like direct surveying, etc.). In some cases, the map feature source is generated based on sensor data (e.g., imagery) collected using one or more aerial devices (e.g., airplanes, aerial drones, etc.), satellite devices, and/or any other remote sensing device capable of generating sensor data or imagery from an overhead perspective.

Once the selection is done, the system 100 can extract data from a data store 303 for data type classification in step 305. Therefore, the system 100 can pre-filter the data by the desired carto type and/or admin level, to improve the output an existence check. Example data types can include (1) road sign information of settlements and/or BUAs, (2) shapefiles of the settlements and/or BUAs, (3) community feedbacks indicating point locations of settlements and/or BUAs with names, (4) imagery data from via any internal system or applications where user identified the settlements and/or BUAs manually via visual observations, (5) aerial LiDAR or similar data, etc. The data of most data types contains latitude, longitude, cartography name, etc. In step 307, the system 100 can extract tertiary data points from the data of one or more data types, and send the tertiary data points to an existence check unit 309 in FIG. 3B to locate the desire cartographic feature (e.g., settlements, BUAs, etc.) in a map database 311 by location.

In other words, once the location of a tertiary data point is identified, the location is sent through a condition and logic test by the existence check unit 309 to determine whether a corresponding cartographic feature polygon to be updated or added as a polygon in the map database 311.

Table 1 represents different existence check scenarios and outputs. In step 313, the existence check unit 309 can determine whether the same level pologon exists for the tertiary data point in the map database 311 as shown in column 3 of Table 1. When the determination is positive ("yes" same level pologon exists for the tertiary data point, e.g., Case 1 & Case 3 in Table 1), the existence check unit 309 can generate secondary data points in step 315 that reflect the exact replica polygon of the existing polygon, and trigger an Update Polygon message (for polygon update cases) in step 317.

When the determination in Table 1 is negative ("no" same level pologon exists for the tertiary data point, e.g., Case 2 & Case 4), the existence check unit 309 can determine whether the same level pologon exists for the tertiary data point in the admin or polgon level (1) based on latitude, longitude, cartographic polygon name (e.g., Valley Park) in step 319 (e.g., Case 2), or based on latitude, longitude only in step 321 (e.g., Case 4), as shown in column 4 of Table 1.

Following the step 319, the existence check unit 309 can verify the cartography name of the tertiary data point (i.e., a data point name, e.g., Valley Park) with a higher level name (e.g., Seven Corners) in step 323, by checking whether there is any similar higher level name in the map database 311 in step 325. When the determination is positive ("yes" similar higher level name exists for the data point name, e.g., Case 2: column 5 in Table 1), the existence check unit 309 can ignore the tertiary data point or trigger a manual review by a user in step 327. When the determination is negative ("no" similar higher level name exists for the data point name, e.g., Case 2: column 5 in Table 1), the existence check unit 309 can check for a pre-existing polygon count within a higher admin level in step 329. When the polygon count within the higher admin level is smaller than 1 (<1), the existence check unit 309 can again ignore the tertiary data point or trigger a manual review by a user in step 327. On the other hand, when the polygon count within the higher admin level is equal to or more than 1 (=>1), the existence check unit 309 can accept the tertiary data point and trigger an Add New Polygon message (for polygon add cases) in step 333.

Following the step 321, since there is not data point name for comparison, the existence check unit 309 can proceed with step 329 directly (e.g., Case 4: column 5 in Table 1). In step 329, the existence check unit 309 can verify a pre-existing polygon count within one higher admin level, and then proceed to step 331 and step 333 as discussed.

In short, in Cases 1 & 3, there is already a polygon of the same admin or polygon level present in the map database 311, the existence check unit 309 can output to an Update Polygon message. As other instances, in Cases 2 & 4, there is no polygon of the same admin or polygon level present in the map database 311, the existence check unit 309 can output to an Add New polygon message. Optionally, the existence check unit 309 can use settlement names to assist the existence check. The final output of the existence check unit 309 can be (1) the secondary data points to trigger a Update Polygon message (for polygon update cases) or (2) the tertiary data points to trigger an Add New Polygon message (for new polygon cases). The final output is sent to an image processing unit 335 in FIG. 3C for image selection and image conversion to monochrome image.

TABLE 1

| Sr No. | Tertiary data point | Map Database Polygon | Admin or Polygon Level | Existence Check at ADMIN Level | Existence check Output |
|---|---|---|---|---|---|
| Case 1 | Lat/Long, Name | Polygon Present | Same | Polygon present with same name | Update Polygon |
| Case 2 | Lat/Long, Name | Polygon Missing | Missing/ Different | Verify name with Higher Admin Name. {If, Data point name = higher admin name: Ignore the data point. If, Data point name ≠ higher admin name: check for polygon count within higher admin; {If, count < 1 : Ignore If, count => 1: Accept} } | New Polygon |
| Case 3 | Lat/Long only | Polygon Present | Same | Polygon Present | Update Polygon |
| Case 4 | Lat/Long only | Polygon Missing | Missing/ Different | Check for polygon count within higher admin. {If, count < 1 : Ignore If, count => 1: Accept} | New Polygon |

Table 2 represents relations among Data Type, Data Point, and Data Format. The image processing unit 335 can retrieve an image based on the data type of the tertiary data point and the data point output (1) or (2) received from existence check unit 309.

TABLE 2

| Sr No. | Data type | Data Point | Data Format |
|---|---|---|---|
| 1 | Map Database | Secondary Data points | Polygon Data |
| 2 | Drive file | Tertiary data | Point data |
| 3 | Shapefile | Tertiary data | Point Data/Polygon data |
| 4 | Community Feedback | Tertiary data | Point data |
| 5 | Imagery | Tertiary data | Point data |
| 6 | Aerial LiDAR Imagery | Tertiary data | Point Data/Polygon data |

For the secondary data points (1), the image processing unit 335 can request the image easily as the secondary data points represent the polygon boundary which need to be checked/processed. For the tertiary data points (2) with a data format of "Polygon Data," the image processing unit 335 can request the image easily as well since the "Polygon Data" can represent a polygon boundary which need to be checked/processed. On the other hand, for the tertiary data points (2) with a data format of "Point Data," the image processing unit 335 can use the web model as discussed (e.g., FIGS. 2B-2C) to derive an exact image size for requesting the image. Based on the image size, an image size selector and converter 343 can put images via a sequence of image selections where the primary reference point is a tertiary data point.

Referring back to FIG. 3C, in step 337, the image processing unit 335 can decide whether a satellite or aerial image exists in an image database 339 that shares the location of the secondary data points or the tertiary data point. If such image does not exist in the image database 339, the image processing unit 335 can again ignore the secondary data points or the tertiary data point in step 341. If such image exists in the image database 339, the image processing unit 335 can send the image to the image size selector and converter 343 for processing that involves a decision making unit 345.

The decision making unit 345 can decide further processing per Data Type. In one embodiment, the decision making unit 345 can include a web modeler 347 and a comparator 349. The web modeler 347 can create a web model layer based on an monochrome image convereted from the image by the image size selector and converter 343. For instance, the monochrome image can indicate houses, buildings, residential physical structures as white dots/shape.

By way of example, the web model layer can be based on the web models discussed in conjunction with FIGS. 2B-2C. The centroid of a web model can placed exactly over one of the secondary data points or the tertiary data point. The comparator 349 can compare and selectly merge a web model polygon (e.g., overlapping data points derived from the web model layer and image processing, such as the polygon 102 in FIG. 2A), the secondary data points (e.g., the data points extracted from a pre-existing polygon in the map database), one or more tertiary data points (e.g., data points derived from the Data Type) and/or the secondary data points, to generate a set of primary data points 351 representing a new polygon layer. The comparator 349 will ignore any tertiary data point that is inside the polygon created by the web model layer or the secondary data points. Blocks of the web model containing the white dots/shape can be highlighted and merged to create a bigger polygon representing a cartographic feature polygon (e.g., a settlement area, a BUA, etc.). The comparator 349 can reference nodes and layers shared between the empty and highlighted web blocks for creating the polygon boundary in a specific order to create an accurate polygon. The primary data points 351 can be sent to a map coder 353 which can either update an pre-existing polygon or add a new polygon to the map database 311 per the information derived from the existence check unit 309. The map coder 353 can stand alone or incorporate into the decision making unit 345.

When any of the tertiary data points overlap with secondary data points representing the boundary of a preexisting polygon, the comparator 349 can merge the tertiary data points with the boundary and keep both sets of data. To update the existing polygon data (not the entire polygon), the comparator 349 can remove data points (not the entire polygon) from the existing polygon data that are absent from the newly created polygon, and add new data points of the newly created polygon that are absent from the existing polygon data.

For example, the comparator 349 can give priority to the secondary data points by adding blocks of the web model which are outside the secondary data points thereinto, to provide the final output of primary data points. A polygon of the primary data points can contain the secondary data points and nodes from the web model.

Figure 4:
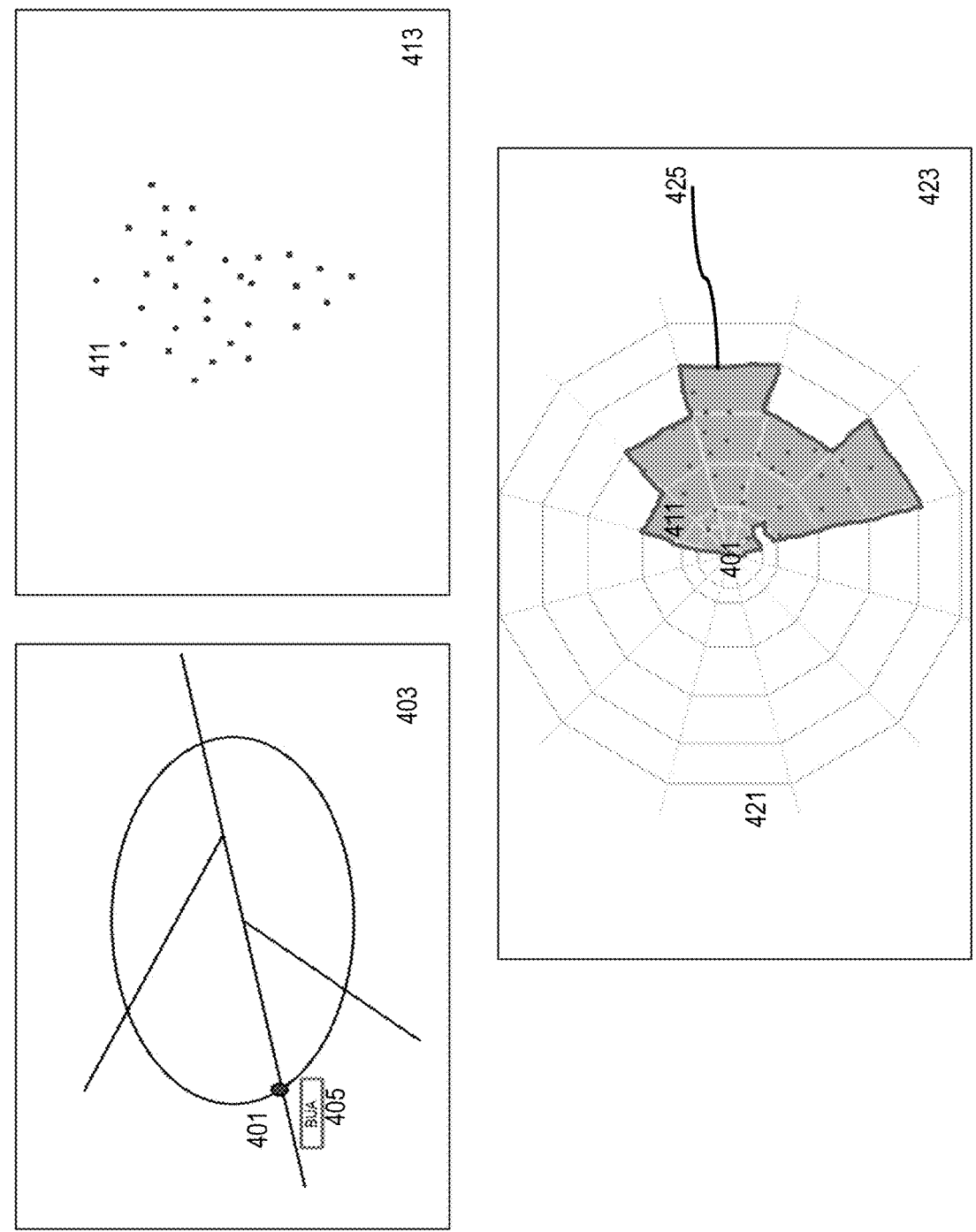
FIG. 4 includes diagrams for adding a new polygon to a map database, according to one embodiment.

FIG. 4 includes diagrams for adding a new polygon to a map database, according to one embodiment. To create a new polygon, the comparator 349 can merge (1) a tertiary data point 401 (e.g., a road sign, a BUA start sign, a BUA end sign, etc.) in an drive file image 403 of a potential BUA 405 (e.g., in an oval shape), (2) the white dots/shape 411 extracted from the monochrome data in an diagram 413, with FIG. C a web model 421 in a diagram 423 to create primary data points representing a new polygon structure 425. For instance, the tertiary data point 401 is placed exactly on the centroid of the web model 421. The primary data point of the new polygon 425 can be sent to the map coder 353 to code and add the new polygon 425 into the map database 311.

Figure 5A:
FIGS. 5A-5B are diagrams for updating a pre-existing polygon in a map database, according to one embodiment.
Figure 5B:
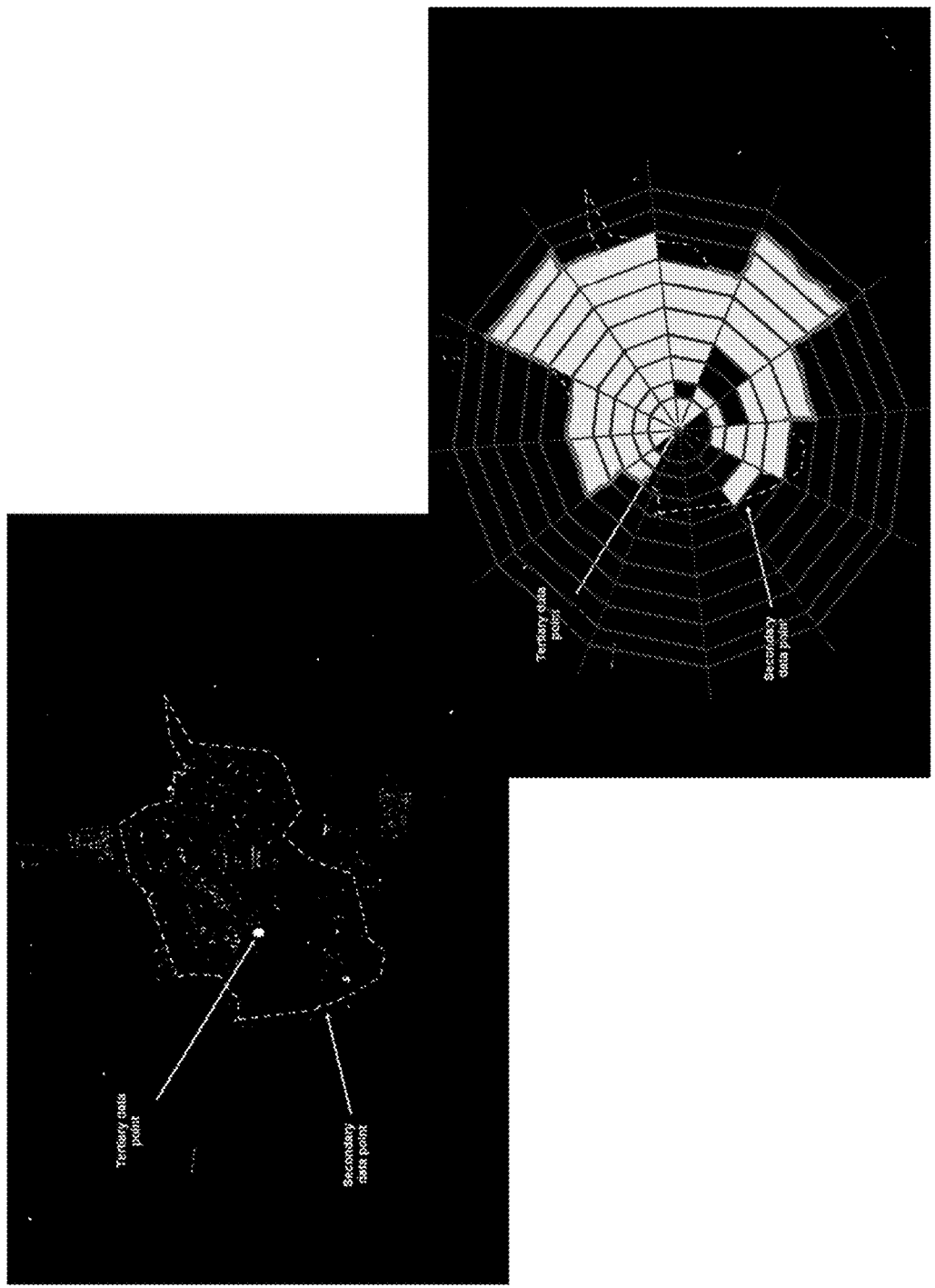

FIGS. 5A-5B are diagrams for updating a pre-existing polygon in a map database, according to one embodiment. FIG. 5A includes an aerial image 501 that depicts the settlement area 101 in FIG. 2A and a tertiary data point 503. FIG. 5A further includes an image 505 that depicts the settlement area 101 and secondary data points 507 representing the boundary of a pre-existing polygon. In FIG. 5B, the image 505 is converted into an monochrome image 511 which indicates white dots 513 representing locations of houses, buildings, and/or residential physical structures, in addition to the tertiary data point 503 and the secondary data points 507. FIG. 5B further include an image 515 that depicts a web model 517. In the image 515, blocks of the web model 517 with primary data point of an updated polygon 519 are merged. As mentioned, the comparator 349 can reference nodes and layers shared between the empty and highlighted web blocks for creating the boundary of the updated polygon 519.

In one embodiment, the system 100 can use data points from raster/aerial/satellite imagery of the area including potential settlement areas, and to create a binary image (consisting of pixels with one of exactly two colors, usually black and white, such as a monochrome image) derived from the raster/aerial/satellite imagery to extract tertiary data points. In one instance, the raster/aerial/satellite imagery may be stored in or accessible by the system 100 in geographic information systems (GIS) databases, satellite imagery access hubs, etc.

In another embodiment, LiDAR data from vehicle sensors can be used in place of or in conjunction with the drive file to verify/confirm the settlement area(s). For instance, the LiDAR data can be used the same way as the drive file data. The redundancy and overlapping detection/verification capabilities can ensure the accuracy of settlement area coding.

In another embodiment, the system 100 can use the data points in a drive file image (e.g., stored in or accessible by a GIS database, a satellite imagery access hub, etc.) to code and/or verify the existence of the settlement areas 101. By way of example, a video drive file can be captured by a vehicle camera, one or more infrastructure sensors 121 (e.g., traffic reporting cameras), etc. By way of example, the infrastructure sensors 121 may be configured to use any sensing technology (e.g., visible light camera sensors, Bluetooth, infrared sensors, LiDAR sensors, radar sensors, acoustic sensors, and the like). In one embodiment, the infrastructure sensors may be used in combination with or in place of any of pedestrian/vehicle sensors to capture drive files as discussed with respect to the described embodiments.

For instance, the system 100 can process sensor data (e.g., image data) from one or more vehicles 103*a*-103*n* (also collectively referred to as vehicles 103) (e.g., standard vehicles, autonomous vehicles, heavily assisted driving (HAD) vehicles, semi-autonomous vehicles, etc.). In one instance, the vehicles 103 include one or more vehicle sensors 105*a*-105*n* (also collectively referred to as vehicle sensors 105) (e.g., positioning sensors) and have connectivity to a mapping platform 107 via a communication network 109. In one embodiment, the sensor data includes probe data which can be reported (e.g., by the vehicles 103) as probe points, which are individual data records collected at a point in time that records telemetry data for that point in time.

In one embodiment, the system 100 can also collect probe data from one or more user equipment (UE) 111*a*-111*n* (also collectively referred to herein as UEs 111) associated with the vehicles 103 (e.g., an embedded navigation system), a user or a passenger of a vehicle 103 (e.g., a mobile device, a smartphone, etc.), or a combination thereof. In one instance, the UEs 111 may include one or more applications 113*a*-113*n* (also collectively referred to herein as applications 113) (e.g., a navigation or mapping application). In one embodiment, the system 100 may also collect the sensor data (e.g., the image data) from one or more other sources such as government/municipality agencies, local or community agencies (e.g., police departments), and/or third-party official/semi-official sources (e.g., the services platform 115, one or more services 117*a*-117*n*, one or more content providers 119*a*-119*m*, etc.). In one instance, the probe data collected by the vehicle sensors 105, the UEs 111, one or more other sources, or a combination thereof may be stored in a geographic database 123.

In another embodiment, the system 100 can use the data points and/or polygons in a shapefile with geospatial vector data for GIS software. The shapefile data are mostly open specification for data interoperability among different GIS software applications and databases. By way of example, a shapefile can spatially describe vector features: points, lines, and polygons representing, for example, settlement areas, BUAs, etc. Each item usually has attributes that describe the item, such as name or temperature. The shapefile format does not store topological information.

In another embodiment, the system 100 can use the data points based on community feedbacks, such as those output from a crowd-sourced application residing in UEs 111. In another embodiment, the system 100 can compare the tagged tertiary data points within the binary image using (e.g., heuristics, rules, machine learning, open-source intelligence, etc.) to identify settlement areas. By analogy, the process 300 can be applied to verify settlement area(s).

Figure 6:
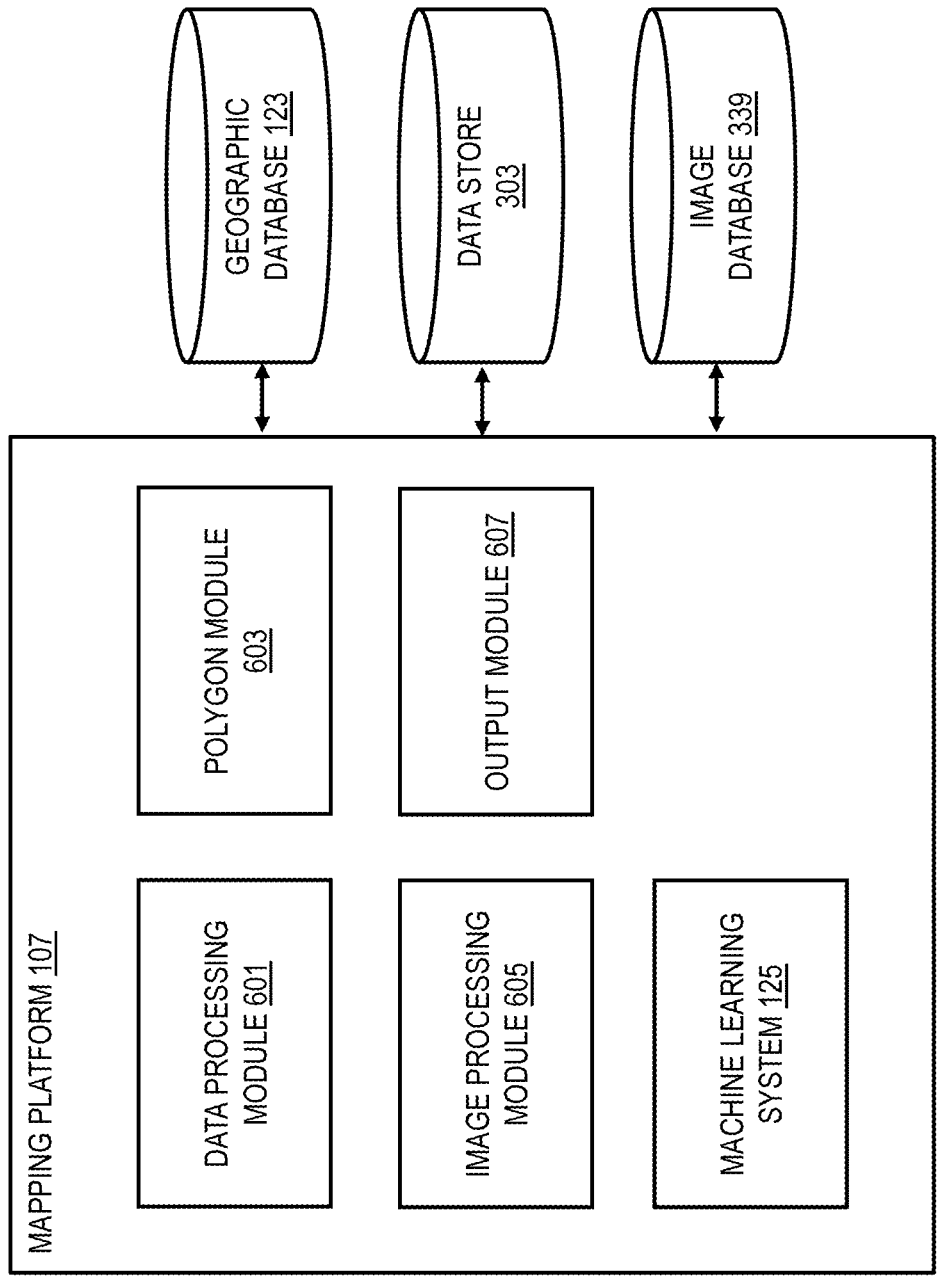
FIG. 6 is a diagram of the components of a mapping platform, according to one embodiment.

FIG. 6 is a diagram of the components of a mapping platform configured to automatically code a non-uniform cartographic feature, according to one embodiment. By way of example, the mapping platform 107 includes one or more components for automatically coding a non-uniform cartographic feature, according to the various embodiments described herein. It is contemplated that the functions of these components may be combined or performed by other components of equivalent functionality. In one embodiment, the mapping platform 107 includes an data processing module 601, a polygon module 603, an image processing module 605, an output module 607, and a machine learning system 125, and has connectivity to the geographic database 123 which includes the image data. The above presented modules and components of the mapping platform 107 can be implemented in hardware, firmware, software, or a combination thereof. Though depicted as a separate entity in FIG. 1, it is contemplated that the mapping platform 107 may be implemented as a module of any other component of the system 100. In another embodiment, the mapping platform 107 and/or the modules 601-607 may be implemented as a cloud-based service, local service, native application, or combination thereof. The functions of the mapping platform 107, the machine learning system 125, and/or the modules 601-607 are discussed with respect to FIGS. 1-5.

Figure 7:
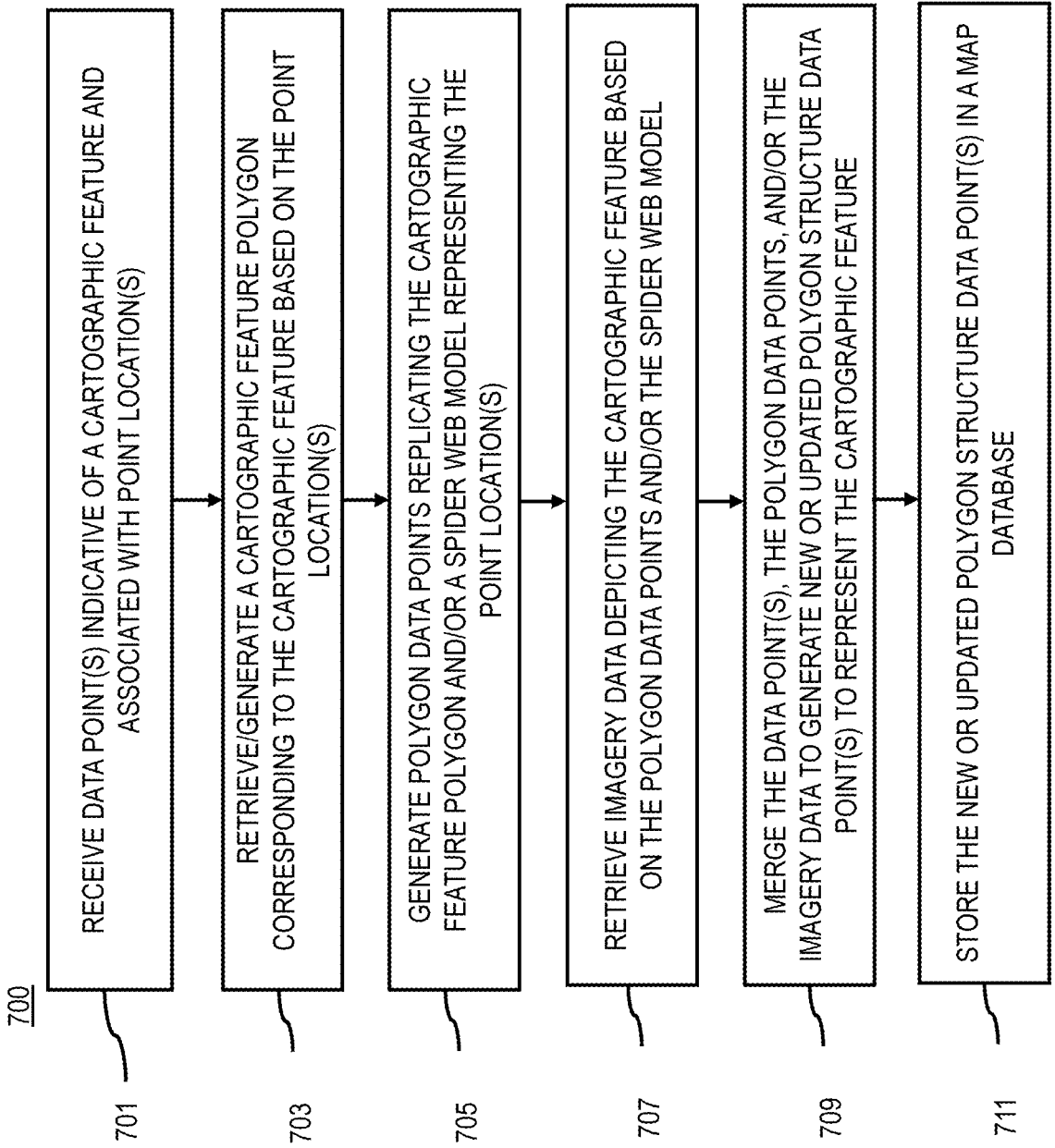
FIG. 7 is a flowchart of a process for automatically coding a non-uniform cartographic feature, according to one embodiment.
Figure 11:
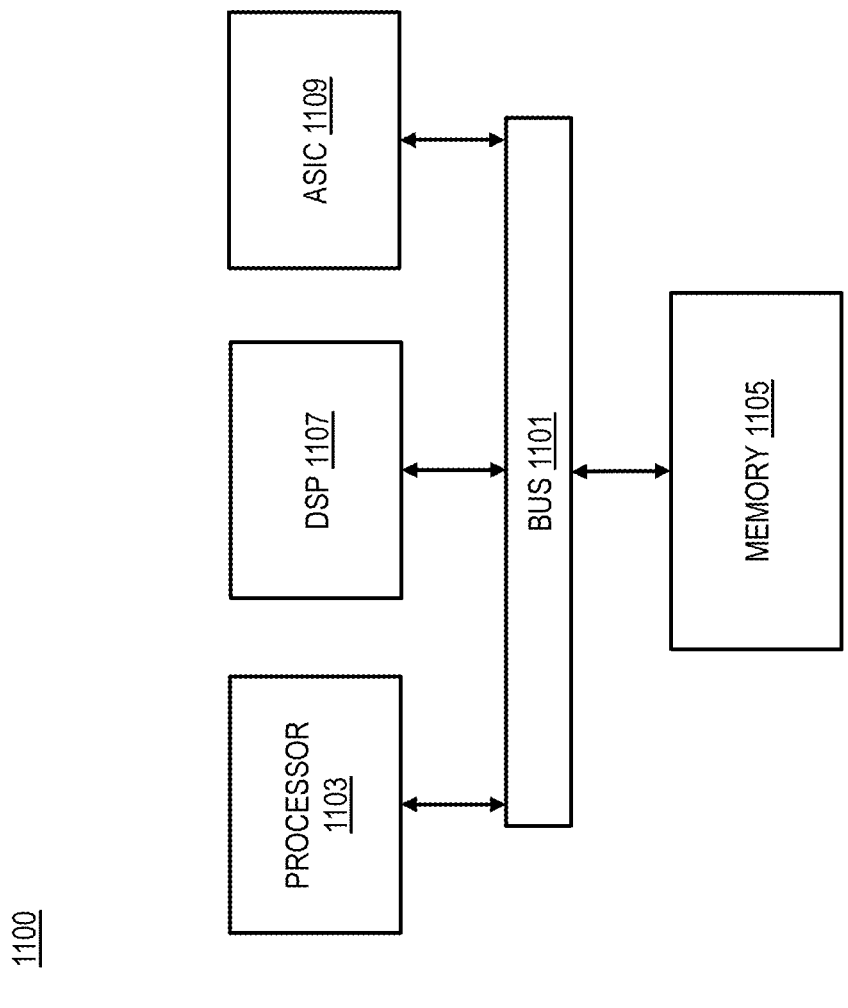
FIG. 11 is a diagram of a chip set that can be used to implement an embodiment.

FIG. 7 is a flowchart of a process for automatically coding a non-uniform cartographic feature, according to one embodiment. In various embodiments, the mapping platform 107, the machine learning system 125, and/or any of the modules 601-607 may perform one or more portions of the process 700 and may be implemented in, for instance, a chip set including a processor and a memory as shown in FIG. 11. As such, the mapping platform 107, the machine learning system 125, and/or the modules 601-607 can provide means for accomplishing various parts of the process 700, as well as means for accomplishing embodiments of other processes described herein in conjunction with other components of the system 100. Although the process 700 is illustrated and described as a sequence of steps, its contemplated that various embodiments of the process 700 may be performed in any order or combination and need not include all the illustrated steps.

In one embodiment, for example, in step 701, the data processing module 601 can receive at least one data point (e.g., the tertiary data point extracted in the step 307 in FIG. 3A, the tertiary data point 401 in FIG. 4, the tertiary data point 503 in FIGS. 5A-5B, etc.) of a data type that is indicative of a cartographic feature (e.g., a built up area (BUA), the settlement area 101 in FIG. 2A, etc.), and the data point is associated with at least one point location (e.g., latitude, longitude). For instance, the data type can be drive file, shapefile, community feedback, output from a crowd-sourced application, or aerial LiDAR data.

In one embodiment, in step 703, the polygon module 603 can retrieve or generate a cartographic feature polygon (e.g., the polygon 102 in FIG. 2A, the polygon 425 in FIG. 4, the updated polygon 519 in FIG. 5B, etc.) corresponding to the cartographic feature (e.g., the settlement area 101 in FIG. 2A) based on the at least one point location. For instance, the cartographic feature polygon can be retrieved from a map database (e.g., the nap database 311 in FIG. 3B, the geographic database 123, etc.) based on an existence check indicating that the cartographic feature polygon corresponding to the at least one point location already exists in the map database.

In one embodiment, in step 705, the polygon module 603 can generate at least one of: a plurality of polygon data points (e.g., the secondary data points 507 in FIGS. 5A-5B) that replicate the cartographic feature polygon (i.e., the pre-existing polygon in the map database), and a spider web model (e.g., the web model 421 in FIG. 4, the web model 517 in FIG. 5B, etc.) that represents the at least one point location of the at least one data point. The spider web model (e.g., the web models 211, 231 in FIGS. 2B-2C) can be a polygonal structure comprising a plurality of polygons of different sizes respectively bounded by different layers having a common centroid and a plurality of radial axes originating from the common centroid.

For instance, the cartographic feature polygon (e.g., the polygon 425 in FIG. 4) can be generated from the spider web model (e.g., the web model 421 in FIG. 4) based on an existence check (e.g., by the existence check unit 309 in FIG. 3B) indicating that the cartographic feature polygon corresponding to the at least one point location does not exists in the map database (e.g., the nap database 311 in FIG. 3B). The common centroid of the spider web model can be placed over one of the at least one point location (e.g., the location of the tertiary data point 401 in FIG. 4).

In one embodiment, in step 707, the image processing module 605 can retrieve imagery data (e.g., from the image database 339 in FIG. 3C) depicting the cartographic feature based on the plurality of polygon data points (e.g., the secondary data points 507 in FIGS. 5A-5B), the spider web model (e.g., the web model 421 in FIG. 4), or a combination thereof (e.g., the web model 517 in FIG. 5B).

In one embodiment, in step 709, the polygon module 603 can merge the at least one data point, the plurality of polygon data points, the imagery data, or a combination thereof to generate one or more new polygon structure data points (e.g., the primary data points of the polygon 425 in FIG. 4) or one or more updated polygon structure data points (e.g., the primary data points of the updated polygon 519 in FIG. 5B) to represent the cartographic feature (e.g., the settlement area 101 in FIG. 2A).

By way of example, the merging of the at least one data point, the plurality of polygon data points, the imagery data, or a combination thereof can comprise generating a monochrome image (e.g., the image 413 in FIG. 4, the image 511 in FIG. 5B) representing the at least one data point, the plurality of polygon data points, the imagery data, or a combination thereof, and the one or more new polygon structure data (e.g., the primary data points of the polygon 425 in FIG. 4) or the one or more updated polygon structure data points (e.g., the primary data points of the updated polygon 519 in FIG. 5B) can be generated based on the monochrome image. For instance, the one or more updated polygon structure data points can be generated by adding one or more blocks of the spider web model that is outside a boundary of the plurality of polygon data points (e.g., as shown in the image 515 in FIG. 5B).

In another embodiment, the merging of the at least one data point, the plurality of polygon data points, the imagery data, or a combination thereof can comprise merging one or more blocks of the spider web model that contains any of the plurality of plurality of polygon data points, the at least one data point, or a combination thereof (e.g., as shown in the diagram 423 in FIG. 4).

In one embodiment, the data processing module 601 can receive a selection of an administration level or a carto type for processing (e.g., the step 301 in FIG. 3A), and filter the at least one data point based on the selection. As such, the cartographic feature polygon can be generated based on the filtered at least one data point.

In one embodiment, in step 711, the output module 607 can storing the one or more new polygon structure data points (e.g., the primary data points of the polygon 425 in FIG. 4) or the one or more updated polygon structure data points (e.g., the primary data points of the updated polygon 519 in FIG. 5B) in a map database (e.g., the map database 311 in FIG. 3B, the geographic database 123, etc.). In another embodiment, the output module 607 can present a mapping user interface depicting the one or more new polygon structure data points or the one or more updated polygon structure data points to represent the cartographic feature.

Figure 8A:
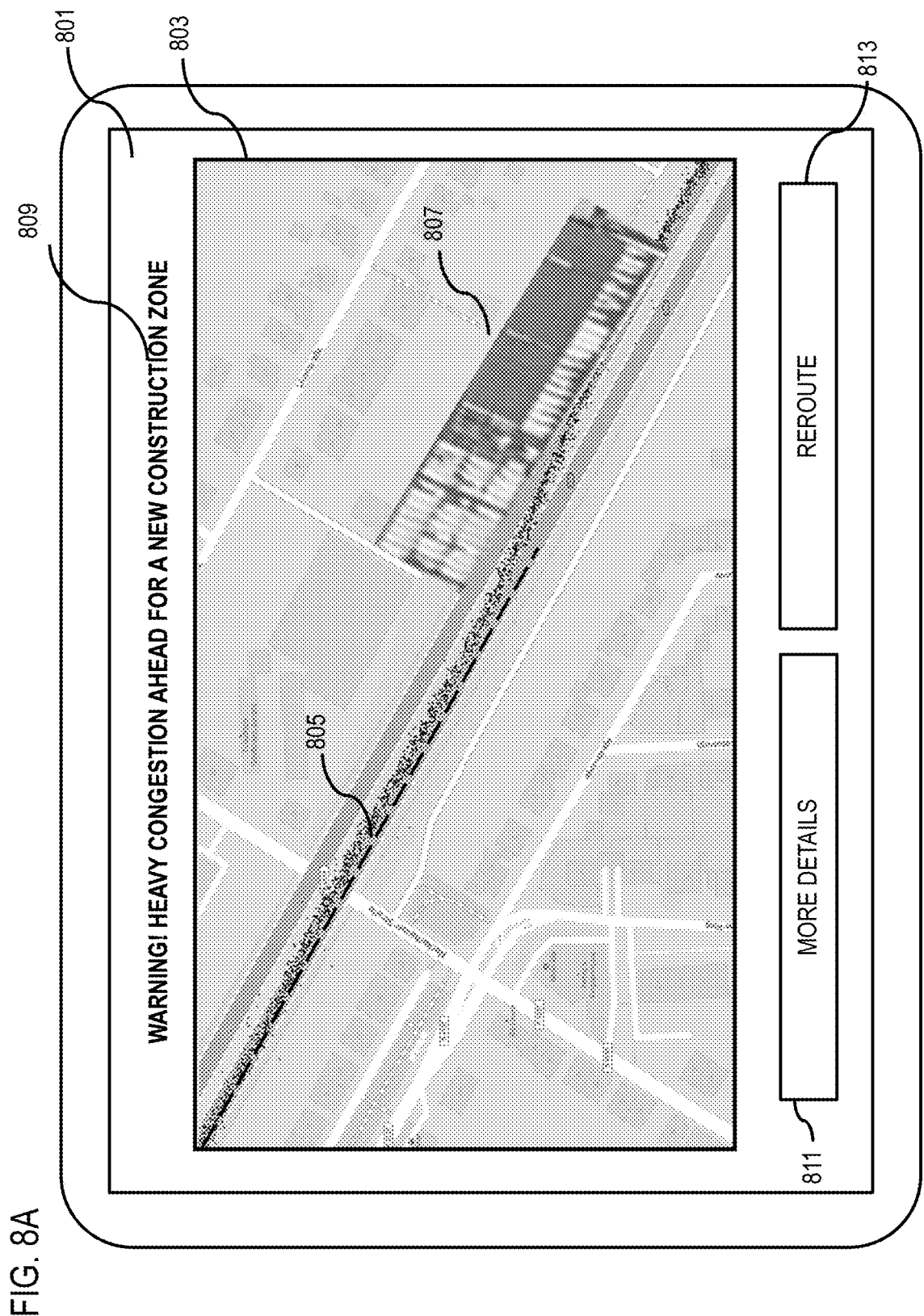
FIGS. 8A-8C are diagrams of example user interfaces for bypassing a congested construction zone coded according to various embodiments.
Figure 8B:
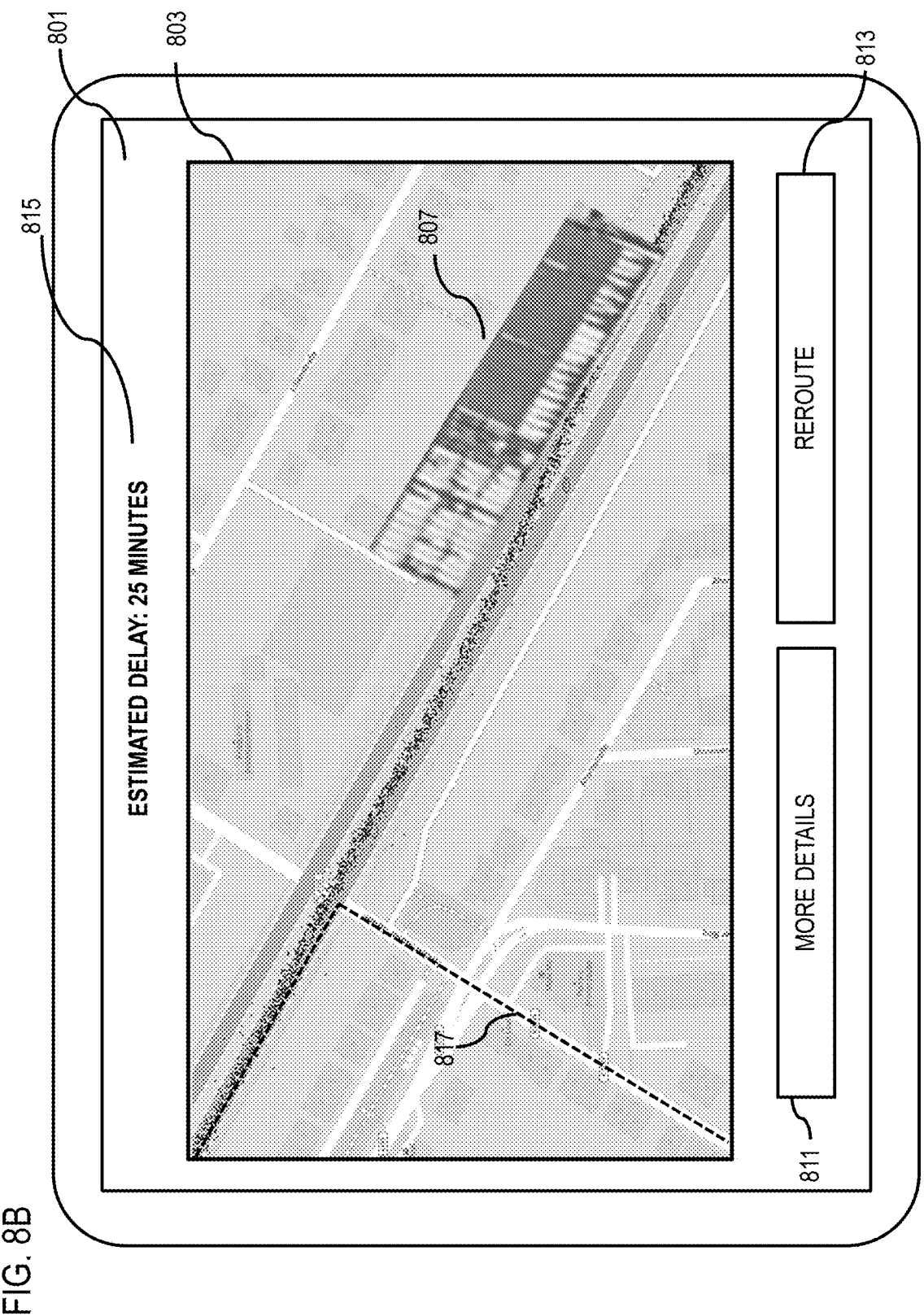
Figure 8C:
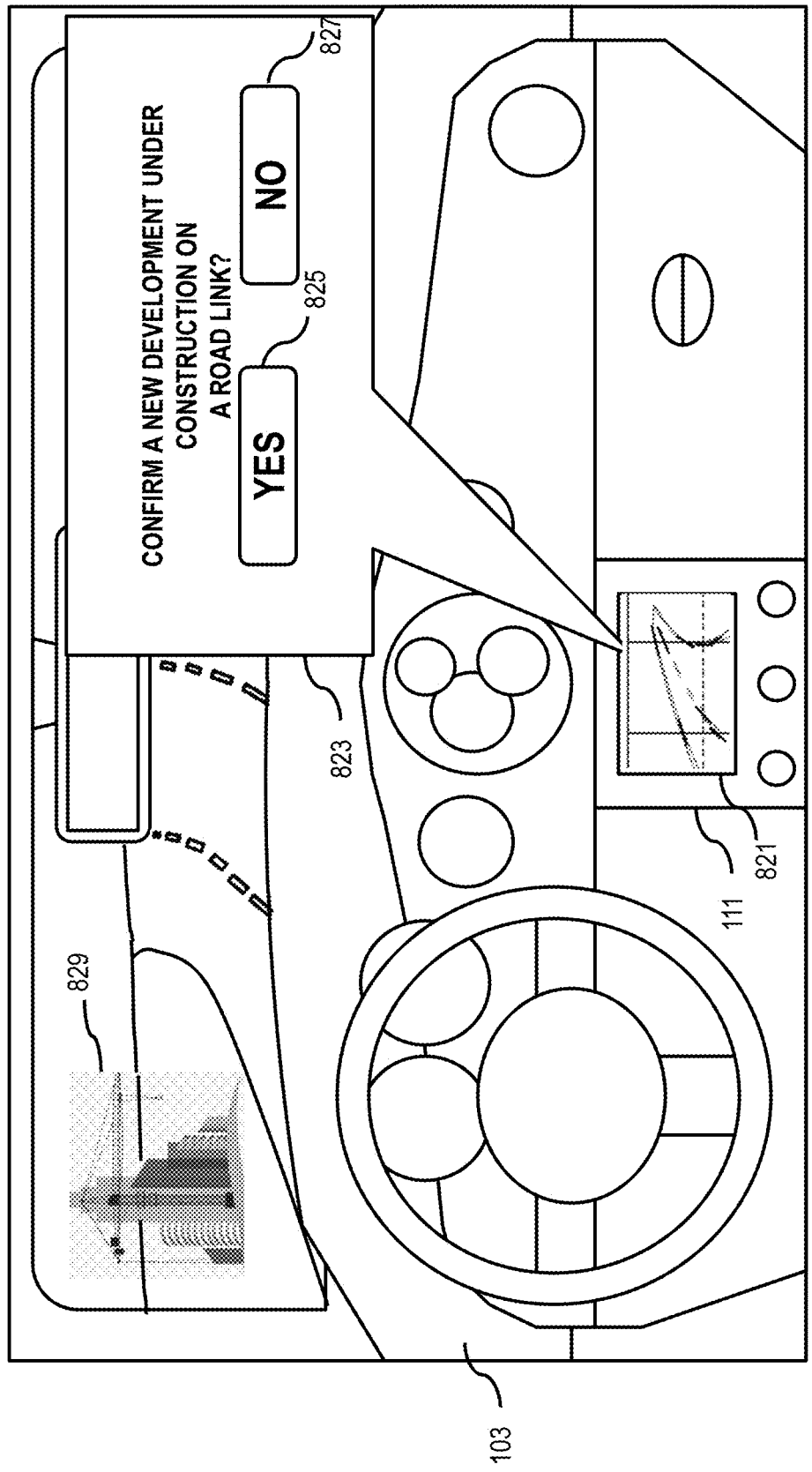

FIGS. 8A-8C are diagrams of example user interfaces for bypassing a congested construction zone coded according to various discussed embodiments. Referring to FIG. 8A, in one embodiment, the system 100 can generate a user interface (UI) 801 (e.g., a navigation application 113) for a UE 111 (e.g., a mobile device, an embedded navigation system, etc.) that can enable a user (e.g., a driver of a vehicle 103) or a vehicle 103 (e.g., an autonomous vehicle) to bypass a congested construction zone while traveling in a road network. In one instance, the system 100 can generate the UI 801 such that it includes a map 803, a route 805 leading to a recently coded construction zone 807 (e.g., a residential complex), and an alert 809: "Warning! Heavy Congestion ahead for a new construction zone." In this example, the system 100 can also generate the UI 801 such that it includes an input 811 (e.g., "More Details") and an input 813 (e.g., "Reroute"). For example, a user can interact with the user interface 801, the various inputs described with respect to FIGS. 8A and 8B (e.g., inputs 811 and 813), or a combination thereof via one or more physical interactions (e.g., a touch, a tap, a gesture, typing, etc.), one or more voice commands (e.g., "show estimated delay," "flag road closure," etc.), or a combination thereof.

In one instance, when a user interacts with the input 811 (e.g., "More Details"), the system 100 can generate the user interface 801 such that it shows an alert 815: "Estimated Delay: 25 minutes," as depicted in FIG. 8B. In another example, when the user interacts with the input 813 (e.g., "Reroute"), the system 100 can generate the UI 801 such that it shows a new route 817 that can enable the user and/or a vehicle 103 to bypass the construction zone 807. It is contemplated that in this instance, the system 100 can determine or detect one or more actions by a user (e.g., an eye gaze) and automatically confirm the interaction. This is particularly useful in the case of a passenger in the vehicle 103.

In FIG. 8C, the system 100 may provide interactive user interfaces (e.g., of UE 111 associated with the vehicle 103) for reporting a new development construction zone location within navigation applications (e.g., Waze®). In one scenario, a user interface (UI) 821 of the vehicle 103 depicts a navigation diagram, and prompts the user with a popup 823: "Confirm a new development under construction on a road link?", for coding and/or verifying a new development. An operator and/or a passenger of the vehicle 103 can select a "yes" button 825 or a "no" button 827 based on the user's observation of a new development 829 on a road segment.

For example, the user interface can present the UI 821 and/or a physical controller such as but not limited to an interface that enables voice commands, a pressure sensor on a screen or window whose intensity reflects the movement of time, an interface that enables gestures/touch interaction, a knob, a joystick, a rollerball or trackball-based interface, or other sensors. As other examples, the sensors can be any type of sensor that can detect a user's gaze, heartrate, sweat rate or perspiration level, eye movement, body movement, or combination thereof, in order to determine a user response to confirm road events. As such, the system 100 can enable a user to confirm a new development as training data for the machine learning model to train as discussed.

In another embodiment, the processing of the image data comprises using a machine learning model (e.g., the machine learning system 125) to code/validate a non-uniform cartographic feature (e.g., a human settlement area) using data points retrieved from a data store (e.g., the data store 303) and aerial image data (e.g., retrieved from the image database 311). For instance, the machine learning model can be trained to detect one or more human settlement structures from the aerial image data. For instance, the machine learning system 125 can select respective factors such as one or more summary statistics of aerial imagery map objects (e.g., sizes, locations, relative distances, etc.), to determine one or more map objects, such as houses, buildings, construction zones, etc. In one embodiment, the machine learning system 125 can select or assign respective weights, correlations, relationships, etc. among the factors, to determine the settlement-related objects/structures in images. In one instance, the machine learning system 125 can continuously provide and/or update a machine learning model (e.g., a support vector machine (SVM), neural network, decision tree, etc.) during training using, for instance, supervised deep convolution networks or equivalents. For instance, such machine learning model can be trained to detect and/or code one or more settlement-related structures from the image data.

For instance, the machine learning system 125 can select respective factors such as one or more summary statistics of drive imagery map objects (e.g., sizes, locations, relative distances, etc.), to determine one or more settlement feature objects, such as building walls, signages, lights, etc. In one embodiment, the machine learning system 125 can select or assign respective weights, correlations, relationships, etc. among the factors, to determine the settlement-related objects/features in drive file images. In one instance, the machine learning system 125 can continuously provide and/or update a machine learning model (e.g., a SVM, neural network, decision tree, etc.) during training using, for instance, supervised deep convolution networks or equivalents. For instance, such machine learning model can be trained (e.g., by the machine learning system 125) to detect settlement structures and/or attributes from the drive file image data.

In one embodiment, the machine learning system 125 can improve the process for detecting and map-coding a settlement area using feedback loops based on, for example, user/vehicle behavior and/or feedback data (e.g., from sensor data, other image data, etc.). In one embodiment, the machine learning system 125 can improve the above-discussed machine learning models using user/vehicle behavior and/or feedback data as training data. For example, the machine learning system 125 can analyze detected/verified settlement and attribute data, missed settlement and attribute data, etc. to determine and to improve upon the performance of the machine learning models.

Returning to FIG. 1, in one embodiment, the mapping platform 107 performs the process for automatically coding a non-uniform cartographic feature as discussed with respect to the various embodiments described herein. For example, the mapping platform 107 can generate road segment related features for machine learning solutions (e.g., using the machine learning system 125).

In one embodiment, the mapping platform 107 has connectivity over the communications network 109 to the services platform 115 (e.g., an OEM platform) that provides the services 117 (e.g., probe and/or sensor data collection services). By way of example, the services 117 may also be other third-party services and include mapping services, navigation services, traffic incident services, travel planning services, notification services, social networking services, content (e.g., audio, video, images, etc.) provisioning services, application services, storage services, contextual information determination services, location-based services, information-based services (e.g., weather, news, etc.), etc. In one embodiment, the services platform 115 uses the output (e.g. whether a road segment is closed or not) of the mapping platform 107 to provide services such as navigation, mapping, other location-based services, etc.

In one embodiment, the mapping platform 107 may be a platform with multiple interconnected components. The mapping platform 107 may include multiple servers, intelligent networking devices, computing devices, components, and corresponding software for providing parametric representations of lane lines. In addition, it is noted that the mapping platform 107 may be a separate entity of the system 100, a part of the services platform 115, a part of the one or more services 117, or included within a vehicle 103 (e.g., an embedded navigation system).

In one embodiment, content providers 119 may provide content or data (e.g., including settlement area data, road closure reports, probe data, expected vehicle volume data, etc.) to the mapping platform 107, the UEs 111, the applications 113, the services platform 115, the services 117, the data store 303, the image database 339, the geographic database 123, and the vehicles 103. The content provided may be any type of content, such as map content, textual content, audio content, video content, image content, etc. In one embodiment, the content providers 119 may provide content regarding the expected frequency of vehicles 103 on the digital map or link as well as content that may aid in localizing a vehicle path or trajectory on a digital map or link (e.g., to assist with determining actual vehicle volumes on a road network). In one embodiment, the content providers 119 may also store content associated with the mapping platform 107, the services platform 115, the services 117, the data store 303, the image database 339, the geographic database 123, and/or the vehicles 103. In another embodiment, the content providers 119 may manage access to a central repository of data, and offer a consistent, standard interface to data, such as a repository of the data store 303, the image database 339, and/or the geographic database 123.

By way of example, the UEs 111 are any type of embedded system, mobile terminal, fixed terminal, or portable terminal including a built-in navigation system, a personal navigation device, mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that a UE 111 can support any type of interface to the user (such as "wearable" circuitry, etc.). In one embodiment, a UE 111 may be associated with a vehicle 103 (e.g., a mobile device) or be a component part of the vehicle 103 (e.g., an embedded navigation system). In one embodiment, the UEs 111 may include the mapping platform 107 to automatically code a non-uniform cartographic feature.

In one embodiment, as mentioned above, the vehicles 103, for instance, are part of a probe-based system for collecting probe data for detecting actual and expected vehicle volumes on a road network and/or measuring traffic conditions in the road network (e.g., free flow traffic versus a road closure). In one embodiment, each vehicle 103 is configured to report probe data as probes, which are individual data records collected at a point in time that records telemetry data for that point in time. In one embodiment, the probe ID can be permanent or valid for a certain period of time. In one embodiment, the probe ID is cycled, particularly for consumer-sourced data, to protect the privacy of the source.

In one embodiment, a probe point can include attributes such as: (1) source ID, (2) longitude, (3) latitude, (4) heading, (5) speed, and (6) time. The list of attributes is provided by way of illustration and not limitation. Accordingly, it is contemplated that any combination of these attributes or other attributes may be recorded as a probe point. For example, attributes such as altitude (e.g., for flight capable vehicles or for tracking non-flight vehicles in the altitude domain), tilt, steering angle, wiper activation, etc. can be included and reported for a probe point. In one embodiment, the vehicles 103 may include vehicle sensors 105 for reporting measuring and/or reporting attributes. The attributes can also be any attribute normally collected by an on-board diagnostic (OBD) system of the vehicle 103, and available through an interface to the OBD system (e.g., OBD II interface or other similar interface).

The probes can be reported from the vehicles 103 in real-time, in batches, continuously, or at any other frequency requested by the system 100 over, for instance, the communication network 109 for processing by the mapping platform 107. The probes also can be map matched to specific road links stored in the geographic database 123. In one embodiment, the system 100 (e.g., via the mapping platform 107) generates vehicle paths or trajectories from the observed and expected frequency of probes for an individual probe as discussed with respect to the various embodiments described herein so that the probe traces represent a travel trajectory or vehicle path of the probe through the road network.

In one embodiment, as previously stated, the vehicles 103 are configured with various sensors (e.g., vehicle sensors 105) for generating or collecting probe data, sensor data, related geographic/map data, etc. In one embodiment, the sensed data represents sensor data associated with a geographic location or coordinates at which the sensor data was collected (e.g., a latitude and longitude pair). In one embodiment, the probe data (e.g., stored in the geographic database 123) includes location probes collected by one or more vehicle sensors 105. By way of example, the vehicle sensors 105 may include a RADAR system, a LiDAR system, global positioning sensor for gathering location data (e.g., GPS), a network detection sensor for detecting wireless signals or receivers for different short-range communications (e.g., Bluetooth, Wi-Fi, Li-Fi, near field communication (NFC) etc.), temporal information sensors, a camera/imaging sensor for gathering image data, an audio recorder for gathering audio data, velocity sensors mounted on a steering wheel of the vehicles 103, switch sensors for determining whether one or more vehicle switches are engaged, and the like. Though depicted as automobiles, it is contemplated the vehicles 103 can be any type of vehicle manned or unmanned (e.g., cars, trucks, buses, vans, motorcycles, scooters, drones, etc.) that travels through road segments of a road network (e.g., road network).

Other examples of sensors 105 of a vehicle 103 may include light sensors, orientation sensors augmented with height sensors and acceleration sensor (e.g., an accelerometer can measure acceleration and can be used to determine orientation of the vehicle), tilt sensors to detect the degree of incline or decline of a vehicle 103 along a path of travel, moisture sensors, pressure sensors, etc. In a further example embodiment, vehicle sensors 105 about the perimeter of a vehicle 103 may detect the relative distance of the vehicle 103 from a physical divider, a lane line of a link or roadway, the presence of other vehicles, pedestrians, traffic lights, potholes and any other objects, or a combination thereof. In one scenario, the vehicle sensors 105 may detect weather data, traffic information, or a combination thereof. In one embodiment, a vehicle 103 may include GPS or other satellite-based receivers to obtain geographic coordinates from satellites 127 for determining current location and time. Further, the location can be determined by visual odometry, triangulation systems such as A-GPS, Cell of Origin, or other location extrapolation technologies.

In one embodiment, the UEs 111 may also be configured with various sensors (not shown for illustrative convenience) for acquiring and/or generating probe data and/or sensor data associated with a vehicle 103, a driver, a passenger, other vehicles, conditions regarding the driving environment or roadway, etc. For example, such sensors may be used as GPS receivers for interacting with the one or more satellites 127 to determine and track the current speed, position, and location of a vehicle 103 travelling along a link or road segment. In addition, the sensors may gather tilt data (e.g., a degree of incline or decline of the vehicle during travel), motion data, light data, sound data, image data, weather data, temporal data and other data associated with the vehicles 103 and/or UEs 111. Still further, the sensors may detect local or transient network and/or wireless signals, such as those transmitted by nearby devices during navigation of a vehicle along a roadway (Li-Fi, near field communication (NFC)) etc.

It is noted therefore that the above described data may be transmitted via the communication network 109 as probe data (e.g., GPS probe data) according to any known wireless communication protocols. For example, each UE 111, application 113, user, and/or vehicle 103 may be assigned a unique probe identifier (probe ID) for use in reporting or transmitting the probe data collected by the vehicles 103 and/or UEs 111. In one embodiment, each vehicle 103 and/or UE 111 is configured to report probe data as probes, which are individual data records collected at a point in time that records telemetry data.

In one embodiment, the mapping platform 107 retrieves aggregated probes gathered and/or generated by the vehicle sensors 105 and/or the UEs 111 resulting from the travel of the UEs 111 and/or vehicles 103 on a road segment of a road network (e.g., the road network). In one instance, the geographic database 123 stores a plurality of probes and/or trajectories generated by different vehicle sensors 105, UEs 111, applications 113, vehicles 103, etc. over a period while traveling in a large, monitored area (e.g., the road network). A time sequence of probes specifies a trajectory—i.e., a path traversed by a UE 111, application 113, vehicle 103, etc. over the period.

In one embodiment, the communication network 109 of the system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

By way of example, the vehicles 103, vehicle sensors 105, mapping platform 107, UEs 111, applications 113, services platform 115, services 117, content providers 119, and/or satellites 127 communicate with each other and other components of the system 100 using well known, new or still developing protocols. In this context, a protocol includes a set of rules defining how the network nodes within the communication network 109 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 9:
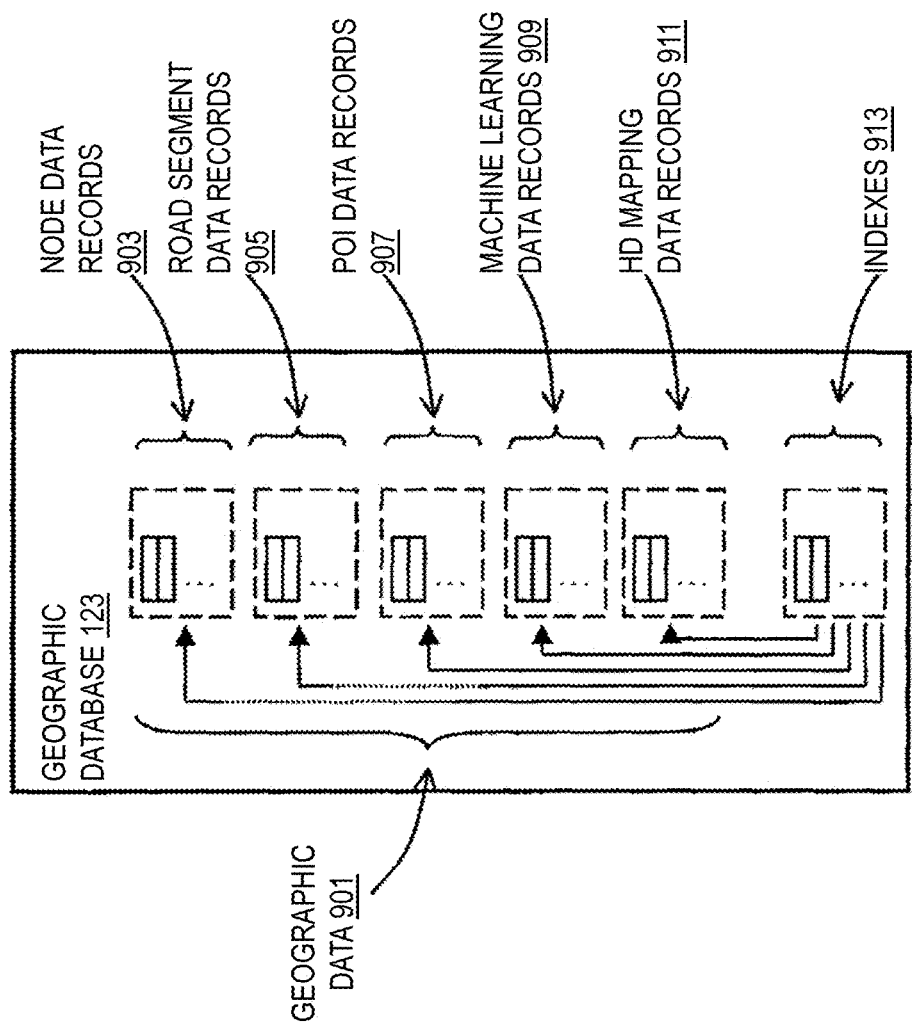
FIG. 9 is a diagram of a geographic database, according to one embodiment.

FIG. 9 is a diagram of a geographic database (such as the database 123), according to one embodiment. In one embodiment, the geographic database 123 includes geographic data 901 used for (or configured to be compiled to be used for) mapping and/or navigation-related services, such as for video odometry based on the parametric representation of lanes include, e.g., encoding and/or decoding parametric representations into lane lines. In one embodiment, the geographic database 123 include high resolution or high definition (HD) mapping data that provide centimeter-level or better accuracy of map features. For example, the geographic database 123 can be based on LiDAR or equivalent technology to collect very large numbers of 3D points depedning on the context (e.g., a single street/scene, a country, etc.) and model road surfaces and other map features down to the number lanes and their widths. In one embodiment, the mapping data (e.g., mapping data records 911) capture and store details such as the slope and curvature of the road, lane markings, roadside objects such as signposts, including what the signage denotes. By way of example, the mapping data enable highly automated vehicles to precisely localize themselves on the road.

In one embodiment, geographic features (e.g., two-dimensional or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions. Accordingly, the terms polygons and polygon extrusions as used herein can be used interchangeably.

In one embodiment, the following terminology applies to the representation of geographic features in the geographic database 123.

"Node"—A point that terminates a link.

"Line segment"— A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 123 follows certain conventions. For example, links do not cross themselves and do not cross each other except at a node. Also, there are no duplicated shape points, nodes, or links. Two links that connect each other have a common node. In the geographic database 123, overlapping geographic features are represented by overlapping polygons. When polygons overlap, the boundary of one polygon crosses the boundary of the other polygon. In the geographic database 123, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic database 123 includes node data records 903, road segment or link data records 905, POI data records 907, cartographic feature polygon data records 909, mapping data records 911, and indexes 913, for example. More, fewer or different data records can be provided. In one embodiment, additional data records (not shown) can include cartographic ("carto") data records, routing data, and maneuver data. In one embodiment, the indexes 913 may improve the speed of data retrieval operations in the geographic database 123. In one embodiment, the indexes 913 may be used to quickly locate data without having to search every row in the geographic database 123 every time it is accessed. For example, in one embodiment, the indexes 913 can be a spatial index of the polygon points associated with stored feature polygons.

In exemplary embodiments, the road segment data records 905 are links or segments representing roads, streets, or paths, as can be used in the calculated route or recorded route information for determination of one or more personalized routes. The node data records 903 are end points (such as intersections) corresponding to the respective links or segments of the road segment data records 905. The road link data records 905 and the node data records 903 represent a road network, such as used by vehicles, cars, and/or other entities. Alternatively, the geographic database 123 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 123 can include data about the POIs and their respective locations in the POI data records 907. The geographic database 123 can also include data about places, such as cities, towns, or other communities, and other geographic features, such as bodies of water, mountain ranges, etc. Such place or feature data can be part of the POI data records 907 or can be associated with POIs or POI data records 907 (such as a data point used for displaying or representing a position of a city). In one embodiment, certain attributes, such as lane marking data records, mapping data records and/or other attributes can be features or layers associated with the link-node structure of the database.

In one embodiment, the geographic database 123 can also include cartographic feature polygon data records 909 for storing cartographic feature data, spider web model data, monochrome image data, tertiary data points, secondary data points, primary data points, training data, prediction models, annotated observations, computed featured distributions, sampling probabilities, and/or any other data generated or used by the system 100 according to the various embodiments described herein. By way of example, the cartographic feature polygon data records 909 can be associated with one or more of the node records 903, road segment records 905, and/or POI data records 907 to support localization or visual odometry based on the features stored therein and the corresponding estimated quality of the features. In this way, the records 909 can also be associated with or used to classify the characteristics or metadata of the corresponding records 903, 905, and/or 907.

In one embodiment, as discussed above, the mapping data records 911 model road surfaces and other map features to centimeter-level or better accuracy. The mapping data records 911 also include lane models that provide the precise lane geometry with lane boundaries, as well as rich attributes of the lane models. These rich attributes include, but are not limited to, lane traversal information, lane types, lane marking types, lane level speed limit information, and/or the like. In one embodiment, the mapping data records 911 are divided into spatial partitions of varying sizes to provide mapping data to vehicles 103 and other end user devices with near real-time speed without overloading the available resources of the vehicles 103 and/or devices (e.g., computational, memory, bandwidth, etc. resources).

In one embodiment, the mapping data records 911 are created from high-resolution 3D mesh or point-cloud data generated, for instance, from LiDAR-equipped vehicles. The 3D mesh or point-cloud data are processed to create 3D representations of a street or geographic environment at centimeter-level accuracy for storage in the mapping data records 911.

In one embodiment, the mapping data records 911 also include real-time sensor data collected from probe vehicles in the field. The real-time sensor data, for instance, integrates real-time traffic information, weather, and road conditions (e.g., potholes, road friction, road wear, etc.) with highly detailed 3D representations of street and geographic features to provide precise real-time also at centimeter-level accuracy. Other sensor data can include vehicle telemetry or operational data such as windshield wiper activation state, braking state, steering angle, accelerator position, and/or the like.

In one embodiment, the geographic database 123 can be maintained by the content provider 119 in association with the services platform 115 (e.g., a map developer). The map developer can collect geographic data to generate and enhance the geographic database 123. There can be different ways used by the map developer to collect data. These ways can include obtaining data from other sources, such as municipalities or respective geographic authorities. In addition, the map developer can employ field personnel to travel by vehicle (e.g., vehicles 103 and/or UEs 111) along roads throughout the geographic region to observe features and/or record information about them, for example. Also, remote sensing, such as aerial or satellite photography, can be used.

The geographic database 123 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle 103 or a UE 111, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processes described herein for automatically coding a non-uniform cartographic feature (e.g., a human settlement area) may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 10:
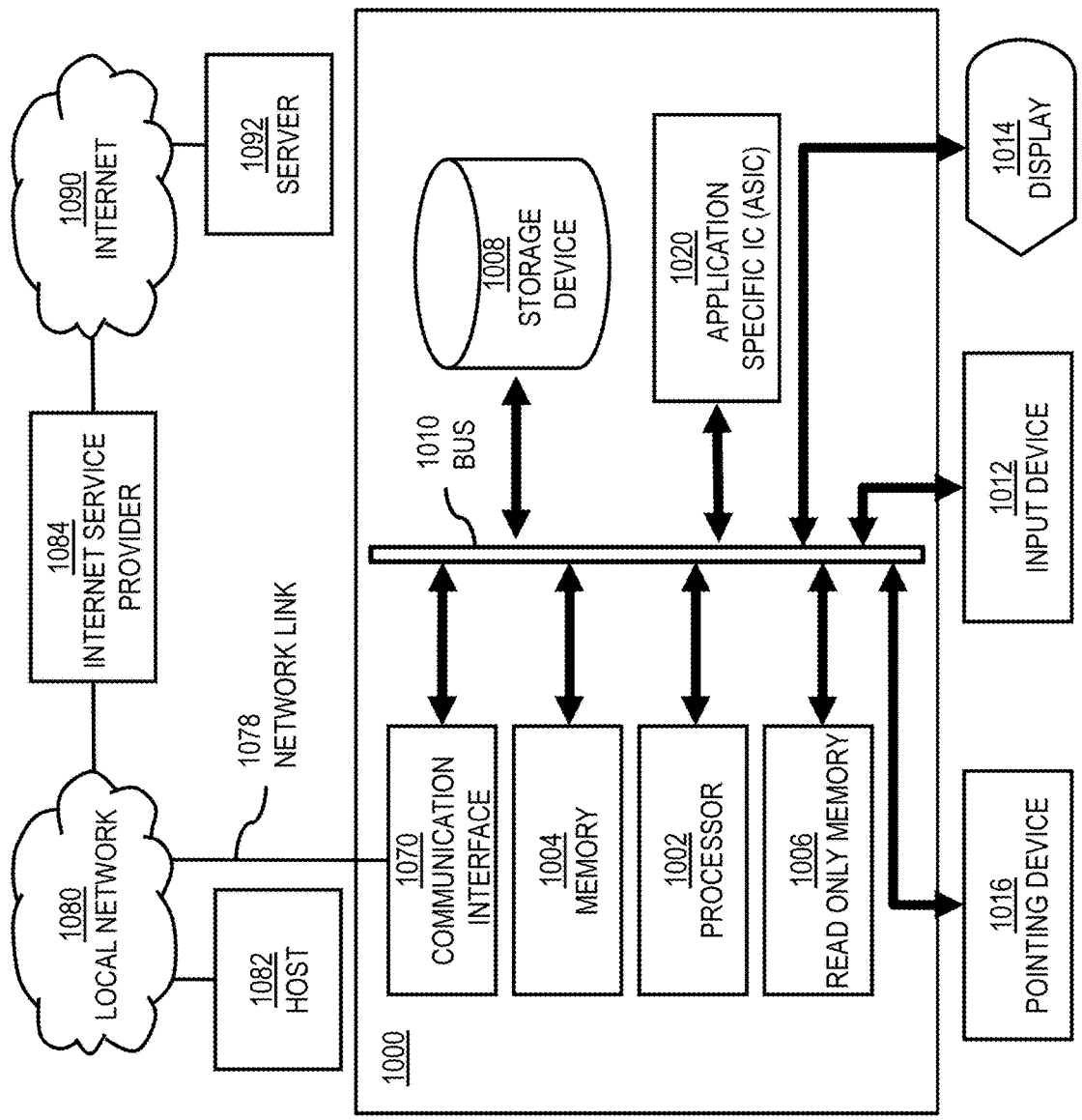
FIG. 10 is a diagram of hardware that can be used to implement an embodiment.

FIG. 10 illustrates a computer system 1000 upon which an embodiment of the invention may be implemented. Computer system 1000 is programmed (e.g., via computer program code or instructions) to automatically code a non-uniform cartographic feature (e.g., a human settlement area) as described herein and includes a communication mechanism such as a bus 1010 for passing information between other internal and external components of the computer system 1000. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 1010 includes one or more parallel conductors of information so that information is transferred quickly among devices coupled to the bus 1010. One or more processors 1002 for processing information are coupled with the bus 1010.

A processor 1002 performs a set of operations on information as specified by computer program code related to automatically coding a non-uniform cartographic feature (e.g., a human settlement area). The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1010 and placing information on the bus 1010. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1002, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1000 also includes a memory 1004 coupled to bus 1010. The memory 1004, such as a random access memory (RAM) or other dynamic storage device, stores information including processor instructions for automatically coding a non-uniform cartographic feature (e.g., a human settlement area). Dynamic memory allows information stored therein to be changed by the computer system 1000. RAM allows a unit of information stored at a location called a memory address to be stored and retrieved independently of information at neighboring addresses. The memory 1004 is also used by the processor 1002 to store temporary values during execution of processor instructions. The computer system 1000 also includes a read only memory (ROM) 1006 or other static storage device coupled to the bus 1010 for storing static information, including instructions, that is not changed by the computer system 1000. Some memory is composed of volatile storage that loses the information stored thereon when power is lost. Also coupled to bus 1010 is a non-volatile (persistent) storage device 1008, such as a magnetic disk, optical disk or flash card, for storing information, including instructions, that persists even when the computer system 1000 is turned off or otherwise loses power.

Information, including instructions for automatically coding a non-uniform cartographic feature (e.g., a human settlement area), is provided to the bus 1010 for use by the processor from an external input device 1012, such as a keyboard containing alphanumeric keys operated by a human user, or a sensor. A sensor detects conditions in its vicinity and transforms those detections into physical expression compatible with the measurable phenomenon used to represent information in computer system 1000. Other external devices coupled to bus 1010, used primarily for interacting with humans, include a display device 1014, such as a cathode ray tube (CRT) or a liquid crystal display (LCD), or plasma screen or printer for presenting text or images, and a pointing device 1016, such as a mouse or a trackball or cursor direction keys, or motion sensor, for controlling a position of a small cursor image presented on the display 1014 and issuing commands associated with graphical elements presented on the display 1014. In some embodiments, for example, in embodiments in which the computer system 1000 performs all functions automatically without human input, one or more of external input device 1012, display device 1014 and pointing device 1016 is omitted.

In the illustrated embodiment, special purpose hardware, such as an application specific integrated circuit (ASIC) 1020, is coupled to bus 1010. The special purpose hardware is configured to perform operations not performed by processor 1002 quickly enough for special purposes. Examples of application specific ICs include graphics accelerator cards for generating images for display 1014, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1000 also includes one or more instances of a communications interface 1070 coupled to bus 1010. Communication interface 1070 provides a one-way or two-way communication coupling to a variety of external devices that operate with their own processors, such as printers, scanners and external disks. In general the coupling is with a network link 1078 that is connected to a local network 1080 to which a variety of external devices with their own processors are connected. For example, communication interface 1070 may be a parallel port or a serial port or a universal serial bus (USB) port on a personal computer. In some embodiments, communications interface 1070 is an integrated services digital network (ISDN) card or a digital subscriber line (DSL) card or a telephone modem that provides an information communication connection to a corresponding type of telephone line. In some embodiments, a communication interface 1070 is a cable modem that converts signals on bus 1010 into signals for a communication connection over a coaxial cable or into optical signals for a communication connection over a fiber optic cable. As another example, communications interface 1070 may be a local area network (LAN) card to provide a data communication connection to a compatible LAN, such as Ethernet. Wireless links may also be implemented. For wireless links, the communications interface 1070 sends or receives or both sends and receives electrical, acoustic or electromagnetic signals, including infrared and optical signals, that carry information streams, such as digital data. For example, in wireless handheld devices, such as mobile telephones like cell phones, the communications interface 1070 includes a radio band electromagnetic transmitter and receiver called a radio transceiver. In certain embodiments, the communications interface 1070 enables connection to the communication network 109 for automatically coding a non-uniform cartographic feature (e.g., a human settlement area).

The term computer-readable medium is used herein to refer to any medium that participates in providing information to processor 1002, including instructions for execution. Such a medium may take many forms, including, but not limited to, non-volatile media, volatile media and transmission media. Non-volatile media include, for example, optical or magnetic disks, such as storage device 1008. Volatile media include, for example, dynamic memory 1004. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

Network link 1078 typically provides information communication using transmission media through one or more networks to other devices that use or process the information. For example, network link 1078 may provide a connection through local network 1080 to a host computer 1082 or to equipment 1084 operated by an Internet Service Provider (ISP). ISP equipment 1084 in turn provides data communication services through the public, world-wide packet-switching communication network of networks now commonly referred to as the Internet 1090.

A computer called a server host 1092 connected to the Internet hosts a process that provides a service in response to information received over the Internet. For example, server host 1092 hosts a process that provides information representing video data for presentation at display 1014. It is contemplated that the components of system can be deployed in various configurations within other computer systems, e.g., host 1082 and server 1092.

FIG. 11 illustrates a chip set 1100 upon which an embodiment of the invention may be implemented. Chip set 1100 is programmed to automatically code a non-uniform cartographic feature (e.g., a human settlement area) as described herein and includes, for instance, the processor and memory components described with respect to FIG. 10 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1100 includes a communication mechanism such as a bus 1101 for passing information among the components of the chip set 1100. A processor 1103 has connectivity to the bus 1101 to execute instructions and process information stored in, for example, a memory 1105. The processor 1103 may include one or more processing cores with each core configured to perform independently. A multi-core processor enables multiprocessing within a single physical package. Examples of a multi-core processor include two, four, eight, or greater numbers of processing cores. Alternatively or in addition, the processor 1103 may include one or more microprocessors configured in tandem via the bus 1101 to enable independent execution of instructions, pipelining, and multithreading. The processor 1103 may also be accompanied with one or more specialized components to perform certain processing functions and tasks such as one or more digital signal processors (DSP) 1107, or one or more application-specific integrated circuits (ASIC) 1109. A DSP 1107 typically is configured to process real-world signals (e.g., sound) in real time independently of the processor 1103. Similarly, an ASIC 1109 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1103 and accompanying components have connectivity to the memory 1105 via the bus 1101. The memory 1105 includes both dynamic memory (e.g., RAM, magnetic disk, writable optical disk, etc.) and static memory (e.g., ROM, CD-ROM, etc.) for storing executable instructions that when executed perform the inventive steps described herein to automatically code a non-uniform cartographic feature (e.g., a human settlement area). The memory 1105 also stores the data associated with or generated by the execution of the inventive steps.

Figure 12:
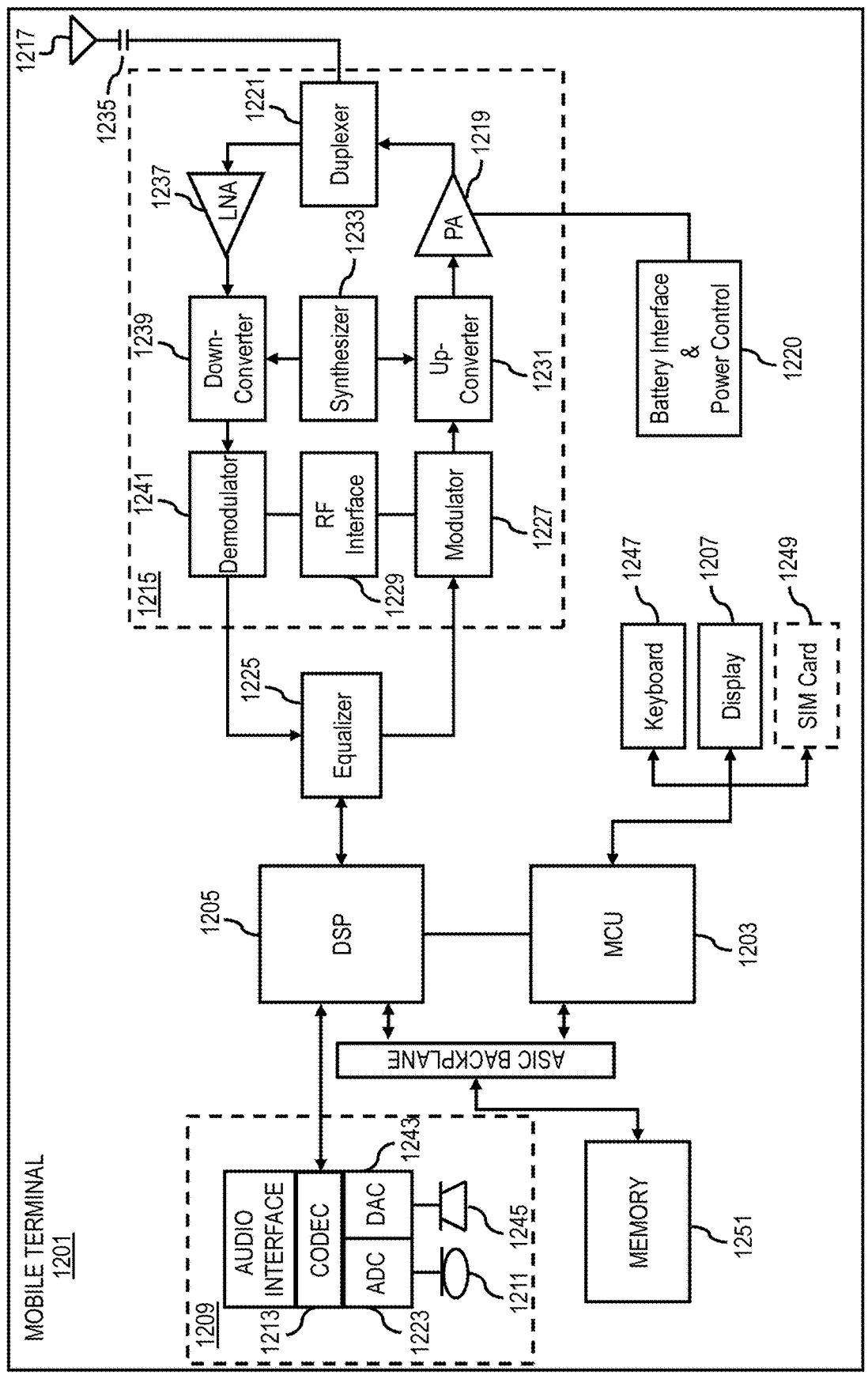
FIG. 12 is a diagram of a mobile terminal (e.g., handset or vehicle or part thereof) that can be used to implement an embodiment.

FIG. 12 is a diagram of exemplary components of a mobile terminal 1201 (e.g., handset or vehicle or part thereof) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1203, a Digital Signal Processor (DSP) 1205, and a receiver/transmitter unit including a microphone gain control unit and a speaker gain control unit. A main display unit 1207 provides a display to the user in support of various applications and mobile station functions that offer automatic contact matching. An audio function circuitry 1209 includes a microphone 1211 and microphone amplifier that amplifies the speech signal output from the microphone 1211. The amplified speech signal output from the microphone 1211 is fed to a coder/decoder (CODEC) 1213.

A radio section 1215 amplifies power and converts frequency in order to communicate with a base station, which is included in a mobile communication system, via antenna 1217. The power amplifier (PA) 1219 and the transmitter/modulation circuitry are operationally responsive to the MCU 1203, with an output from the PA 1219 coupled to the duplexer 1221 or circulator or antenna switch, as known in the art. The PA 1219 also couples to a battery interface and power control unit 1220.

In use, a user of mobile station 1201 speaks into the microphone 1211 and his or her voice along with any detected background noise is converted into an analog voltage. The analog voltage is then converted into a digital signal through the Analog to Digital Converter (ADC) 1223. The control unit 1203 routes the digital signal into the DSP 1205 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1225 for compensation of any frequency-dependent impairments that occur during transmission though the air such as phase and amplitude distortion. After equalizing the bit stream, the modulator 1227 combines the signal with a RF signal generated in the RF interface 1229. The modulator 1227 generates a sine wave by way of frequency or phase modulation. In order to prepare the signal for transmission, an up-converter 1231 combines the sine wave output from the modulator 1227 with another sine wave generated by a synthesizer 1233 to achieve the desired frequency of transmission. The signal is then sent through a PA 1219 to increase the signal to an appropriate power level. In practical systems, the PA 1219 acts as a variable gain amplifier whose gain is controlled by the DSP 1205 from information received from a network base station. The signal is then filtered within the duplexer 1221 and optionally sent to an antenna coupler 1235 to match impedances to provide maximum power transfer. Finally, the signal is transmitted via antenna 1217 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1201 are received via antenna 1217 and immediately amplified by a low noise amplifier (LNA) 1237. A down-converter 1239 lowers the carrier frequency while the demodulator 1241 strips away the RF leaving only a digital bit stream. The signal then goes through the equalizer 1225 and is processed by the DSP 1205. A Digital to Analog Converter (DAC) 1243 converts the signal and the resulting output is transmitted to the user through the speaker 1245, all under control of a Main Control Unit (MCU) 1203—which can be implemented as a Central Processing Unit (CPU) (not shown).

The MCU 1203 receives various signals including input signals from the keyboard 1247. The keyboard 1247 and/or the MCU 1203 in combination with other user input components (e.g., the microphone 1211) comprise a user interface circuitry for managing user input. The MCU 1203 runs a user interface software to facilitate user control of at least some functions of the mobile station 1201 to automatically code a non-uniform cartographic feature (e.g., a human settlement area). The MCU 1203 also delivers a display command and a switch command to the display 1207 and to the speech output switching controller, respectively. Further, the MCU 1203 exchanges information with the DSP 1205 and can access an optionally incorporated SIM card 1249 and a memory 1251. In addition, the MCU 1203 executes various control functions required of the station. The DSP 1205 may, depending upon the implementation, perform any of a variety of conventional digital processing functions on the voice signals. Additionally, DSP 1205 determines the background noise level of the local environment from the signals detected by microphone 1211 and sets the gain of microphone 1211 to a level selected to compensate for the natural tendency of the user of the mobile station 1201.

The CODEC 1213 includes the ADC 1223 and DAC 1243. The memory 1251 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1251 may be, but not limited to, a single memory, CD, DVD, ROM, RAM, EEPROM, optical storage, or any other non-volatile or non-transitory storage medium capable of storing digital data.

An optionally incorporated SIM card 1249 carries, for instance, important information, such as the cellular phone number, the carrier supplying service, subscription details, and security information. The SIM card 1249 serves primarily to identify the mobile station 1201 on a radio network. The card 1249 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
receiving at least one data point of a data type that is indicative of a cartographic feature, wherein the data point is associated with at least one point location;
retrieving or generating a cartographic feature polygon corresponding to the cartographic feature based on the at least one point location;
generating at least one of:
a plurality of polygon data points that replicate the cartographic feature polygon, and
a spider web model that represents the at least one point location of the at least one data point, wherein the spider web model is a two-dimensional polygonal structure;
retrieving imagery data depicting the cartographic feature based on the plurality of polygon data points, the spider web model, or a combination thereof;
merging the at least one data point, the plurality of polygon data points, the imagery data, or a combination thereof to generate one or more new polygon structure data points or one or more updated polygon structure data points to represent the cartographic feature; and
storing the one or more new polygon structure data points or the one or more updated polygon structure data points in a map database.

2. The method of claim 1, wherein the cartographic feature is a built up area or a settlement area.

3. The method of claim 1, wherein the cartographic feature polygon is retrieved from the map database based on an existence check indicating that the cartographic feature polygon corresponding to the at least one point location already exists in the map database.

4. The method of claim 1, wherein the cartographic feature polygon is generated from the spider web model based on an existence check indicating that the cartographic feature polygon corresponding to the at least one point location does not exists in the map database.

5. The method of claim 1, wherein the merging of the at least one data point, the plurality of polygon data points, the imagery data, or a combination thereof comprises generating a monochrome image representing the at least one data point, the plurality of polygon data points, the imagery data, or a combination thereof, and wherein the one or more new polygon structure data or the one or more updated polygon structure data points are generated based on the monochrome image.

6. The method of claim 1, wherein the one or more updated polygon structure data points is generated by adding one or more blocks of the spider web model that is outside a boundary of the plurality of polygon data points.

7. The method of claim 1, wherein the merging of the at least one data point, the plurality of polygon data points, the imagery data, or a combination thereof comprises merging one or more blocks of the spider web model that contains any of a plurality of the plurality of polygon data points, the at least one data point, or a combination thereof.

8. The method of claim 1, further comprising:
presenting a mapping user interface depicting the one or more new polygon structure data points or the one or more updated polygon structure data points to represent the cartographic feature.

9. The method of claim 1, further comprising:
receiving a selection of an administration level or a carto type for processing; and
filtering the at, least one data point, based on the selection, wherein the cartographic feature polygon is generated based on the filtered at least one data point.

10. The method of claim 1, wherein the data type is drive file, shapefile, community feedback, output from a crowd-sourced application, or LiDAR data.

11. The method of claim 1, wherein the spider web model is a two-dimensional polygonal structure comprising a plurality of polygons of different sizes respectively bounded by different layers having a common centroid and a plurality of radial axes originating from the common centroid.

12. The method of claim 11, wherein the common centroid of the spider web model is placed over one of the at least one point location.

13. An apparatus comprising:
at least one processor; and
at least one memory including computer program code for one or more programs,
the at least one memory and the computer program code configured to, with the at least one processor, cause the apparatus to perform at least the following:
receive at least one data point of a data type that is indicative of a cartographic feature, wherein the data point is associated with at least one point location;
retrieve or generate a cartographic feature polygon corresponding to the cartographic feature based on the at least one point location;
generate at least one of:
a plurality of polygon data points that replicate the cartographic feature polygon, and
a spider web model that represents the at least one point location of the at least one data point, wherein the spider web model is a two-dimensional polygonal structure;
retrieve imagery data depicting the cartographic feature based on the plurality of polygon data points, the spider web model, or a combination thereof;
merge the at least one data point, the plurality of polygon data points, the imagery data, or a combination thereof to generate one or more, new polygon structure data points or one or more updated polygon structure data points to represent the cartographic feature; and
store the one or more new polygon structure data points or the one or more updated polygon structure data points in a map database.

14. The apparatus of claim 13, wherein the cartographic feature is a built up area or a settlement area.

15. The apparatus of claim 13, wherein the cartographic feature polygon is retrieved from the map database based on an existence check indicating that the cartographic feature polygon corresponding to the at least one point location already exists in, the map database.

16. The apparatus of claim 13, wherein the cartographic feature polygon is generated from the spider web model based on an existence check indicating that the cartographic feature polygon corresponding to the at least one point location does not exists in the map database.

17. The apparatus of claim 13, wherein the merging of the at least one data point, the plurality of polygon data points, the imagery data, or a combination thereof comprises generating a monochrome image representing the at least one data point, the plurality of polygon data points, the imagery data, or a combination thereof, and wherein the one or more new polygon structure data or the one or more updated polygon structure data points are generated based on the monochrome image.

18. A non-transitory computer readable storage medium including one or more sequences of one or more instructions which, when executed by one or more processors, cause an apparatus to at least perform:

receiving at least one data point of a data type that is indicative of a cartographic feature, wherein the data point is associated with at least one point location;

retrieving or generating a cartographic feature polygon corresponding to the cartographic feature based on the at least one point location;

generating at least one of:
 a plurality of polygon data points that replicate the cartographic feature polygon, and
 a spider web model that represents the at least one point location of the at least one data point, wherein the spider web model is a two-dimensional polygonal structure;

retrieving imagery data depicting the cartographic feature based on the plurality of polygon data points, the spider web model, or a combination thereof;

merging the at least one data point, the plurality of polygon data points, the imagery data, or a combination thereof to generate one or more new polygon structure data points or one or more updated polygon structure data points to represent the cartographic feature; and storing the one or more new polygon structure data points or the one or more updated polygon structure data points in a map database.

19. The computer readable storage medium of claim 18, wherein the cartographic feature is a built up area or a settlement area.

20. The computer readable storage medium of claim 18, wherein the cartographic feature polygon is retrieved from the map database based on an existence check indicating that the cartographic feature polygon corresponding to the at least one point location already exists in the map database.

\* \* \* \* \*